US012776094B2

(12) United States Patent
Liu

(10) Patent No.: US 12,776,094 B2
(45) Date of Patent: Oct. 27, 2026

(54) RAY TRACING RENDERING BASED ON RAY EMISSION DENSITY

(71) Applicant: Honor Device Co., Ltd., Shenzhen (CN)

(72) Inventor: Zhichao Liu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 61 days.

(21) Appl. No.: 18/840,681

(22) PCT Filed: May 22, 2023

(86) PCT No.: PCT/CN2023/095631
§ 371 (c)(1),
(2) Date: Aug. 22, 2024

(87) PCT Pub. No.: WO2024/027286
PCT Pub. Date: Feb. 8, 2024

(65) Prior Publication Data

US 2025/0166281 A1 May 22, 2025

(30) Foreign Application Priority Data

Aug. 4, 2022 (CN) ......................... 202210934786.9

(51) Int. Cl.
*G06T 15/06* (2011.01)
*G06T 15/04* (2011.01)
*G06T 15/50* (2011.01)

(52) U.S. Cl.
CPC .............. *G06T 15/06* (2013.01); *G06T 15/04* (2013.01); *G06T 15/50* (2013.01)

(58) Field of Classification Search
None
See application file for complete search history.

(56) References Cited

U.S. PATENT DOCUMENTS 5,613,048 A * 3/1997 Chen ..................... G06T 15/205 345/473
2013/0002671 A1* 1/2013 Armsden ................ G06T 15/50 345/426

(Continued)

FOREIGN PATENT DOCUMENTS

CN 113648655 A 11/2021
CN 113888392 A 1/2022

(Continued)

OTHER PUBLICATIONS

Pankratz, David; Vulkan Vision: Ray Tracing Workload Characterization using Automatic Graphics Instrumentation; Mar. 2021; 2021 IEEE/ACM International Symposium on Code Generation and Optimization (CGO); p. 137-148; https://ieeexplore.ieee.org/abstract/document/9370320 (Year: 2021).*

(Continued)

*Primary Examiner* — Joni Hsu
(74) *Attorney, Agent, or Firm* — Conley Rose, P.C.

(57) ABSTRACT

Embodiments of this application relate to the field of electronic technologies. Provided are a rendering method and apparatus, a device, and a storage medium. In a graphics rendering process, for a to-be-rendered model included in to-be-rendered data, when the to-be-rendered model meets a first condition, ray tracing rendering is performed on the to-be-rendered model based on first ray emission density; or when the to-be-rendered model meets a second condition, ray tracing rendering is performed on the to-be-rendered model based on second ray emission density. When the first condition is different from the second condition, the first ray emission density is different from the second ray emission density. In the technical solution, when a condition met by the to-be-rendered model changes, ray emission density for performing ray tracing rendering can be adaptively adjusted, (Continued)

which reduces power consumption during rendering and improves rendering efficiency while ensuring a rendering effect.

20 Claims, 7 Drawing Sheets

(56) References Cited

U.S. PATENT DOCUMENTS

| | | | |
|---|---|---|---|
| 2015/0262407 A1 | 9/2015 | Fursund et al. | |
| 2020/0211266 A1 | 7/2020 | Brownlee et al. | |
| 2021/0337136 A1* | 10/2021 | Chang | G06T 7/337 |
| 2022/0005256 A1 | 1/2022 | Hughes et al. | |
| 2023/0230311 A1 | 7/2023 | Xie et al. | |
| 2023/0316633 A1 | 10/2023 | Jiangzheng et al. | |
| 2023/0334761 A1 | 10/2023 | Blackmon et al. | |

FOREIGN PATENT DOCUMENTS

| | | | |
|---|---|---|---|
| CN | 114255315 A | 3/2022 | |
| CN | 114581589 A | 6/2022 | |
| CN | 114820910 A * | 7/2022 | G06T 19/006 |
| EP | 3179448 A1 | 6/2017 | |

OTHER PUBLICATIONS

English translation of CN114820910A (Year: 2022).*

Walewski, Patryk, et al., "Heuristic based real-time hybrid rendering with the use of rasterization and ray tracing method", Open Phys. vol. 17, No. 1, Jan. 2019, 18 pp. 527-544, XP093147734, ISSN:2391-5471, DOI: 10.1515/phys-2019-0055.

Guangming Shi, et al., "Context-based adaptive image resolution upconversion", Journal of Electronic Imaging, vol. 19, No. 1, Feb. 24, 2010, 9 pages, XP055116067, ISSN: 1017-9909, DOI:10.1117/1.3327934.

* cited by examiner

RAY TRACING RENDERING BASED ON RAY EMISSION DENSITY

CROSS-REFERENCE TO RELATED APPLICATIONS

This is a U.S. National Stage of International Application No. PCT/CN2023/095631, filed on May 22, 2023, which claims priority to Chinese Patent Application No. 202210934786.9, filed on Aug. 4, 2022, both of which are hereby incorporated by reference in their entireties.

TECHNICAL FIELD

This application relates to the field of image processing technologies, and in particular, to a rendering method and apparatus, a device, and a storage medium.

BACKGROUND

With the continuous development of computer graphics, rendering, as the most important research topic in computer graphics, has gradually been widely applied. The ray tracing technology can generate rendering results that are close to the real world based on real laws of physics, and is a principal technology for achieving high-quality, realistic, and high-quality profiles.

In a ray tracing process in which the ray tracing technology is used for rendering to obtain realistic profiles, it is necessary to trace each ray in a scene, causing high computing overheads. The ray tracing technology is a heavy-load technology on a mobile terminal, resulting in high power consumption and a poor execution effect of ray tracing on the mobile terminal.

SUMMARY

Embodiments of this application provide a rendering method and apparatus, a device, and a storage medium, to resolve problems of high power consumption and low execution efficiency in an existing ray tracing process.

According to a first aspect of this application, a rendering method is provided, applied to an electronic device. The method includes: obtaining to-be-rendered data, where the to-be-rendered data includes a to-be-rendered model; and performing ray tracing rendering on the to-be-rendered model based on first ray emission density when the to-be-rendered model meets a first condition; or performing ray tracing rendering on the to-be-rendered model based on second ray emission density when the to-be-rendered model meets a second condition. That the to-be-rendered model meets the first condition includes: a visible range proportion of the to-be-rendered model in a to-be-rendered picture being a first visible range proportion, and a distance between the to-be-rendered model and a photographing apparatus being a first distance. That the to-be-rendered model meets the second condition includes: a visible range proportion of the to-be-rendered model in a to-be-rendered picture being a second visible range proportion, and a distance between the to-be-rendered model and a photographing apparatus being a second distance. The first visible range proportion is different from the second visible range proportion, and/or the first distance is different from the second distance. The to-be-rendered picture is drawn through the photographing apparatus based on the to-be-rendered data in a rendering process, and the photographing apparatus is a virtual camera in the electronic device. When the first condition is different from the second condition, the first ray emission density is different from the second ray emission density.

In embodiments of this application, the ray emission density of the to-be-rendered model is calculated based on the visible range proportion of the to-be-rendered model in the to-be-rendered picture and the distance between the to-be-rendered model and the photographing apparatus. In addition, when the visible range proportion of the to-be-rendered model in the to-be-rendered picture changes, and/or the distance between the to-be-rendered model and the photographing apparatus changes, that is, a condition met by the to-be-rendered model changes, the ray emission density for performing ray tracing rendering may be adaptively adjusted, which reduces power consumption during rendering and improves the rendering efficiency while ensuring a rendering effect.

In a possible implementation of the first aspect, when the first visible range proportion is the same as the second visible range proportion, if the first distance is greater than the second distance, the first ray emission density is less than the second ray emission density. In this way, the ray emission density of the to-be-rendered model is affected by the distance between the to-be-rendered model and the photographing apparatus. A shorter distance indicates a greater contribution of the to-be-rendered model to the to-be-rendered picture, and higher calculated density of ray tracing correspondingly, so that the power consumption during rendering can be reduced while ensuring image quality.

In a possible implementation of the first aspect, when the first distance is the same as the second distance, if the first visible range proportion is greater than the second visible range proportion, the first ray emission density is greater than the second ray emission density. In this way, the ray emission density of the to-be-rendered model is determined by the visible range proportion of the to-be-rendered model in the to-be-rendered picture. A higher visible range proportion indicates a greater contribution of the to-be-rendered model to the to-be-rendered picture, and higher calculated density of ray tracing correspondingly, so that the power consumption during rendering is reduced while ensuring the image quality.

In a possible implementation of the first aspect, the method further includes: determining a condition met by the to-be-rendered model according to the visible range proportion of the to-be-rendered model in the to-be-rendered picture and the distance between the to-be-rendered model and the photographing apparatus; and determining ray emission density of the to-be-rendered model according to the condition met by the to-be-rendered model. When the condition is the first condition, the ray emission density is the first ray emission density; and when the condition is the second condition, the ray emission density is the second ray emission density. In this possible implementation, impact of the to-be-rendered model on the image quality of the to-be-rendered picture is measured based on different factors, and different ray emission density is calculated based on this, providing a possibility of reducing the power consumption during rendering while ensuring the image quality.

In a possible implementation of the first aspect, the determining ray emission density of the to-be-rendered model according to the condition met by the to-be-rendered model includes: performing, based on a preset first weight coefficient and second weight coefficient, weighted summation on the visible range proportion of the to-be-rendered model in the to-be-rendered picture and the distance between the to-be-rendered model and the photographing apparatus, to obtain a ray emission density coefficient of the to-be-rendered model; and determining the ray emission density of the to-be-rendered model according to the ray emission density coefficient of the to-be-rendered model and a preset first relationship, where the first relationship indicates a correspondence between the ray emission density coefficient and the ray emission density. In practical application, although both the visible range proportion of the to-be-rendered model in the to-be-rendered picture and the distance between the to-be-rendered model and the photographing apparatus make contributions to the to-be-rendered picture, the contributions are different. In this embodiment, importance of the to-be-rendered model in the to-be-rendered picture can be accurately determined by setting the first weight coefficient and the second weight coefficient, laying foundation for determining accurate ray emission density.

In a possible implementation of the first aspect, the performing ray tracing rendering on the to-be-rendered model based on the ray emission density, where the ray emission density is the first ray emission density or the second ray emission density, includes: performing ray tracing rendering on the to-be-rendered model based on the ray emission density, to obtain a ray tracing rendering result image of the to-be-rendered model, where the ray tracing rendering result image carries a hole pixel; and performing color filling on the hole pixel in the ray tracing rendering result image according to a template value of each pixel of the to-be-rendered model during drawcall and a scene semantic image of the to-be-rendered model, where the scene semantic image is used for identifying a model to which a pixel belongs. In this embodiment, ray tracing rendering is performed based on the determined ray emission density, so that the hole pixel is generated in the to-be-rendered picture. Therefore, color filling further needs to be performed on the hole pixel in the ray tracing rendering result image, to obtain an image with complete colors, thereby ensuring the rendering effect of the to-be-rendered picture.

In a possible implementation of the first aspect, the performing ray tracing rendering on the to-be-rendered model based on the ray emission density, to obtain a ray tracing rendering result image of the to-be-rendered model includes: determining, based on the ray emission density and a preset shaded pixel arrangement, a target pixel on which ray tracing rendering needs to be performed in the to-be-rendered model, where the shaded pixel arrangement indicates position arrangement information of a pixel rendered by using ray tracing; performing ray tracing rendering on the target pixel, to obtain color data of the target pixel; and outputting the color data to a position at which the target pixel is located, to obtain the ray tracing rendering result image of the to-be-rendered model. In this embodiment, the position of the pixel in which a ray tracing rendering technology is used can be ensured by using the preset shaded pixel arrangement, laying foundation for accurately performing ray tracing rendering subsequently.

In a possible implementation of the first aspect, the performing, according to a template value of each pixel of the to-be-rendered model during drawcall and a scene semantic image of the to-be-rendered model, color filling on the hole pixel in the ray tracing rendering result image includes: determining, for any pixel in the ray tracing rendering result image, whether a current pixel that is sampled is a hole pixel; when the current pixel is a hole pixel, determining, based on the template value of each pixel of the to-be-rendered model during drawcall and the scene semantic image, a reference pixel having a same template value as the hole pixel on the ray tracing rendering result image, where the reference pixel is a pixel that is on the ray tracing rendering result image and already has color data; and performing color filling on the hole pixel by using the color data of the reference pixel. In this embodiment, a target rendered image with complete colors can be obtained by traversing and performing color filling on the hole pixels in the ray tracing rendering result image, laying foundation for subsequently outputting an image that meets a requirement of the image quality.

In a possible implementation of the first aspect, the determining, based on the template value of each pixel of the to-be-rendered model during drawcall and the scene semantic image, a reference pixel having a same template value with the hole pixel on the ray tracing rendering result image includes: obtaining, according to the scene semantic image of the to-be-rendered model, texture coordinates of the hole pixel and texture coordinates of a first pixel that is on the ray tracing rendering result image and already has color data; querying a template buffering position based on the texture coordinates of the hole pixel and the texture coordinates of the first pixel, and determining a template value of the hole pixel and a template value of the first pixel, where the template buffering position is used for storing the template value of each pixel of the to-be-rendered model during drawcall; and determining, when the template value of the hole pixel is consistent with the template value of the first pixel, the first pixel as the reference pixel of the hole pixel; or traversing, when the template value of the hole pixel is inconsistent with the template value of the first pixel, other pixels that are on the ray tracing rendering result image and already have color data until the reference pixel having the same template value as the hole pixel is identified. In this way, pixels in the same model are used for performing color filling, so that color data of the hole pixel in the to-be-rendered model is the same as the color data of the position of the pixel on which ray tracing rendering is performed, ensuring the image quality of the to-be-rendered picture.

In a possible implementation of the first aspect, the performing ray tracing rendering on the to-be-rendered model includes: performing ray tracing rendering on the to-be-rendered model by using a bound vulkan ray tracing acceleration structure. In practical application, an API vulkan, can provide lower CPU overhead and more direct GPU control. Therefore, the vulkan may be applied to a ray tracing technology on a mobile terminal. A ray tracing algorithm is executed on the mobile terminal based on the vulkan ray tracing acceleration structure, improving the image rendering efficiency.

According to a second aspect, an embodiment of this application provides a rendering apparatus. The rendering apparatus may be an electronic device, or may be a chip or a chip system in the electronic device. The rendering apparatus may include a processing module. When the rendering apparatus is an electronic device, the processing module is configured to implement a method described in the first aspect or any possible implementation of the first aspect. When the rendering apparatus is an electronic device, the processing module may be a processor. The rendering apparatus may further include a storage module, and the storage module may be a memory. The storage module is configured to store instructions, and the processing module executes the instructions stored in the storage module, so that the electronic device implements a method described in the first aspect or any possible implementation of the first aspect. When the rendering apparatus is a chip or a chip system in the electronic device, the processing module may be a processor. The processing module executes instructions stored in a storage module, so that the electronic device implements a method described in the first aspect or any possible implementation of the first aspect. The storage module may be a storage unit (for example, a register or a buffer) in the chip, or may be a storage unit (for example, a read-only memory or a random access memory) located in the electronic device and outside the chip.

For example, the processing module may include an obtaining unit and a processing unit.

Correspondingly, the obtaining unit is configured to obtain to-be-rendered data. A to-be-rendered picture corresponding to the to-be-rendered data includes a to-be-rendered model, and the to-be-rendered picture is drawn through a photographing apparatus based on the to-be-rendered data in a rendering process.

The processing unit is configured to perform ray tracing rendering on the to-be-rendered model based on first ray emission density when the to-be-rendered model meets a first condition, and perform ray tracing rendering on the to-be-rendered model based on second ray emission density when the to-be-rendered model meets a second condition.

That the to-be-rendered model meets the first condition includes: a visible range proportion of the to-be-rendered model in a to-be-rendered picture being a first visible range proportion, and a distance between the to-be-rendered model and a photographing apparatus being a first distance.

That the to-be-rendered model meets the second condition includes: a visible range proportion of the to-be-rendered model in a to-be-rendered picture being a second visible range proportion, and a distance between the to-be-rendered model and a photographing apparatus being a second distance.

The first visible range proportion is different from the second visible range proportion, and/or the first distance is different from the second distance.

In a possible implementation, when the first visible range proportion is the same as the second visible range proportion, if the first distance is greater than the second distance, the first ray emission density is less than the second ray emission density.

In a possible implementation, when the first distance is the same as the second distance, if the first visible range proportion is greater than the second visible range proportion, the first ray emission density is greater than the second ray emission density.

In a possible implementation, the processing unit is further configured to determine a condition met by the to-be-rendered model according to the visible range proportion of the to-be-rendered model in the to-be-rendered picture and the distance between the to-be-rendered model and the photographing apparatus, and determine the ray emission density of the to-be-rendered model according to the condition met by the to-be-rendered model.

When the condition met by the to-be-rendered model is the first condition, the ray emission density is the first ray emission density; and when the condition met by the to-be-rendered model is the second condition, the ray emission density is the second ray emission density.

In a possible implementation, when determining the ray emission density of the to-be-rendered model according to the condition met by the to-be-rendered model, the processing unit is specifically configured to perform, based on a preset first weight coefficient and second weight coefficient, weighted summation on the visible range proportion of the to-be-rendered model in the to-be-rendered picture and the distance between the to-be-rendered model and the photographing apparatus, to obtain a ray emission density coefficient of the to-be-rendered model; and determine the ray emission density of the to-be-rendered model according to the ray emission density coefficient of the to-be-rendered model and a preset first relationship, where the first relationship indicates a correspondence between the ray emission density coefficient and the ray emission density.

In a possible implementation, when performing ray tracing rendering on the to-be-rendered model based on the ray emission density, where the ray emission density is the first ray emission density or the second ray emission density, the processing unit is specifically configured to perform ray tracing rendering on the to-be-rendered model based on the ray emission density, to obtain a ray tracing rendering result image of the to-be-rendered model, where the ray tracing rendering result image carries a hole pixel; and perform color filling on the hole pixel in the ray tracing rendering result image according to a template value of each pixel of the to-be-rendered model during drawcall and a scene semantic image of the to-be-rendered model, where the scene semantic image is used for identifying a model to which a pixel belongs.

In a possible implementation, when performing ray tracing rendering on the to-be-rendered model based on the ray emission density, to obtain the ray tracing rendering result image of the to-be-rendered model, the processing unit is specifically configured to determine, based on the ray emission density and a preset shaded pixel arrangement, a target pixel on which ray tracing rendering needs to be performed in the to-be-rendered model, where the shaded pixel arrangement indicates pixel position arrangement information on which the ray tracing rendering is performed; perform ray tracing rendering on the target pixel, to obtain color data of the target pixel; and output the color data to a position at which the target pixel is located, to obtain the ray tracing rendering result image of the to-be-rendered model.

In a possible implementation, when performing, according to a template value of each pixel of the to-be-rendered model during drawcall and a scene semantic image of the to-be-rendered model, color filling on the hole pixel in the ray tracing rendering result image, the processing unit is specifically configured to determine, for any pixel in the ray tracing rendering result image, whether a current pixel that is sampled is a hole pixel; when the current pixel is a hole pixel, determine, based on the template value of each pixel of the to-be-rendered model during drawcall and the scene semantic image, a reference pixel having a same template value as the hole pixel on the ray tracing rendering result image, where the reference pixel is a pixel that is on the ray tracing rendering result image and already has color data; and perform color filling on the hole pixel by using the color data of the reference pixel.

In a possible implementation, when determining, based on the template value of each pixel of the to-be-rendered model during drawcall and the scene semantic image, a reference pixel having a same template value with the hole pixel on the ray tracing rendering result image, the processing unit is specifically configured to obtain, according to the scene semantic image of the to-be-rendered model, texture coordinates of the hole pixel and texture coordinates of a first pixel that is on the ray tracing rendering result image and already has color data; query a template buffering position based on the texture coordinates of the hole pixel and the texture coordinates of the first pixel, and determine a template value of the hole pixel and a template value of the first pixel, where the template buffering position is used for storing the template value of each pixel of the to-be-rendered model during drawcall; and determine, when the template value of the hole pixel is consistent with the template value of the first pixel, the first pixel as the reference pixel of the hole pixel; or traverse, when the template value of the hole pixel is inconsistent with the template value of the first pixel, other pixels that are on the ray tracing rendering result image and already have color data until the reference pixel having the same template value as the hole pixel is identified.

In a possible implementation, when performing ray tracing rendering on the to-be-rendered model, the processing unit is specifically configured to perform ray tracing rendering on the to-be-rendered model by using a bound vulkan ray tracing acceleration structure.

According to a third aspect, an embodiment of this application provides an electronic device, including a memory and a processor. The memory is configured to store a computer program, and the processor is configured to execute the computer program, to perform the method described in the first aspect or any possible implementation of the first aspect.

According to a fourth aspect, an embodiment of this application provides a computer-readable storage medium. The computer-readable storage medium stores a computer program or instructions. When the computer program or the instructions are executed on a computer, the computer is enabled to perform the method described in the first aspect or any possible implementation of the first aspect.

According to a fifth aspect, an embodiment of this application provides a computer program product including a computer program. When the computer program is executed on a computer, the computer is enabled to perform the method described in the first aspect or any possible implementation of the first aspect.

According to a sixth aspect, this application provides a chip or a chip system. The chip or the chip system includes at least one processor and a communication interface. The communication interface is interconnected to the at least one processor through a wire. The at least one processor is configured to execute a computer program or instructions, to perform the method described in the first aspect or any possible implementation of the first aspect. The communication interface in the chip may be an input/output interface, a pin, a circuit, or the like.

In a possible implementation, the chip or the chip system described in this application further includes at least one memory, and the at least one memory stores instructions. The memory may be a storage unit inside the chip, for example, a register or a buffer, or may be a storage unit (for example, a read-only memory or a random access memory) of the chip.

It should be understood that the second aspect to the sixth aspect of this application correspond to the technical solution of the first aspect of this application, and the beneficial effects obtained by each aspect and the corresponding feasible implementations are similar. Details are not described herein again.

DESCRIPTION OF EMBODIMENTS

Figure 1:
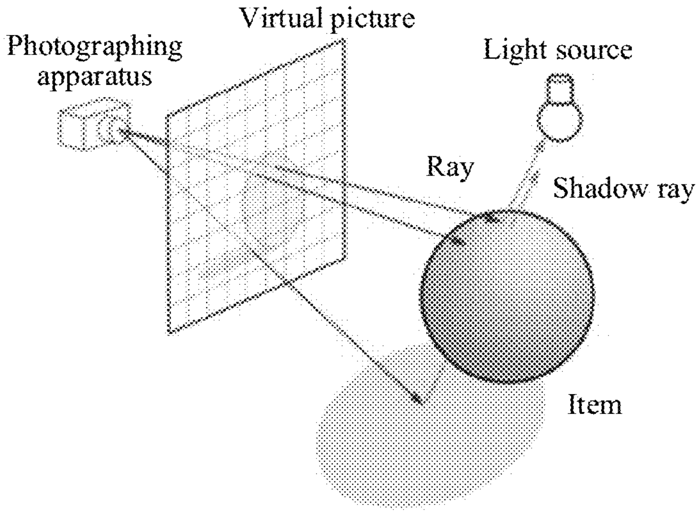
FIG. 1 is a schematic diagram of a principle of ray tracing.

For ease of clearly describing the technical solutions of embodiments of this application, some terms and technologies in embodiments of this application are briefly introduced below:

1. Render: It is a process in which software generates an image through a model. The model, which may be understood as an object or an item, is a three-dimensional item or virtual scene strictly defined by using a language or a data structure in a to-be-rendered picture, including information such as geometry, a viewpoint, a texture, and lighting. In embodiments of this application, the image is a digital image or a bitmap image.

2. To-be-rendered data: It includes model data and material data. The model data refers to coordinate data, position coordinates, normal coordinates, texture coordinates, tangent coordinates, and the like of each triangular vertex in a model formed by triangular meshes. If a three-dimensional scene includes an animation, the model data also includes animation information. The material data may include highlight maps, material maps, physical color maps, reflectivity maps (a ratio of reflection to refraction on a material surface), and the like. That is, the material data stores data in a form of maps.

3. Photographing apparatus: In embodiments, the photographing apparatus is a virtual camera arranged in an electronic device in a graphics rendering scene. The three-dimensional scene can be observed from a degree and a direction by using the virtual camera, to obtain appearance display of the virtual scene. Generally, a position of the photographing apparatus in the device is fixed. However, different appearance displays can be seen by changing a degree and an orientation of the photographing apparatus.

4. Ray tracing is a general technology from geometrical optics, which traces light rays that interact with an optical surface to obtain a model of a path of the light rays. The ray tracing technology can achieve effects such as reflection, refraction, shadow, or caustics by tracing each ray emitted by a camera, to simulate a realistic virtual scene and render realistic images.

5. Vulkan: It is a programming interface for graphics and computing devices, specifically a cross-platform 2D and 3D drawing application programming interface (API), designed to provide lower central processing unit (CPU) overheads and more direct graphics processing unit (GPU) control.

Vulkan is a brand-new API design that can be designed completely according to a modern graphics architecture, providing a finer sophisticated API to developers, supporting multi-threaded parallel creation and submission of instructions, and using standardized shader bytecode to provide unified graphics and a computing function. With the help of vulkan, multi-core and multi-threaded potential of the GPU can be maximized.

6. Level of detail (LOD): LOD, also referred to as a level of detail model, is a real-time three-dimensional computer graphics technology. The basic idea is as follows: An item contributes less to a rendered image, and a simpler form is used for expressing the item. Therefore, in an image rendering process, different LODs can be set according to a distance range between an item and a photographing apparatus, so that different items can choose different details for display, thereby avoiding waste of time and resource consumption caused by drawing details that are relatively insignificant, reducing a load of hardware, and improving rendering performance.

Optionally, in a game scene, objects with different levels of detail can be switched for display according to a distance between the photographing apparatus and a model (that is, the object), so that details of nearby objects are rich, and many details of distant objects may be ignored. This reduces an amount of rendering calculation and improves fluency.

7. Other Terms

In embodiments of this application, terms such as "first" and "second" are used to distinguish between same items or similar items that have basically same functions and purposes. For example, a first chip and a second chip are merely used for distinguishing between different chips, and are not intended to limit a sequence thereof. A person skilled in the art may understand that the terms such as "first" and "second" do not limit a quantity or an execution sequence, and the terms such as "first" and "second" do not indicate a definite difference.

It should be noted that in embodiments of this application, the terms, such as "exemplary" and "for example", are used to represent giving an example, an illustration, or a description. Any embodiment or design scheme described as "exemplary" or "for example" in this application should not be construed as being more preferred or more advantageous than another embodiment or design scheme. To be precise, the use of the terms such as "exemplary" or "for example" is intended to present a related concept in a specific manner.

In embodiments of this application, "at least one" means one or more, and "a plurality of" means two or more. "And/or" describes an association relationship for describing associated objects and represents that three relationships may exist. For example, A and/or B may represent: only A exists, both A and B exist, and only B exists, where A and B may be singular or plural. The character "/" generally indicates an "or" relationship between the associated objects. "At least one of the following items (pieces)" or a similar expression thereof refers to any combination of these items, including a single item (piece) or any combination of a plurality of items (pieces). For example, at least one of a, b, or c may represent: a, b, c, a-b, a-c, b-c, or a-b-c, where a, b, and c may be singular or plural.

With the continuous development of computer graphics, rendering, as the most important research topic in computer graphics, is gradually applied to various fields such as computer and video games, simulations, film or television special effects, and visual design. In applications related to graphics rendering, such as games, virtual simulations, and virtual reality (VR)/augmented reality (AR), how to improve reality of rendered pictures is a goal that attracts much attention.

In 3D computer graphics, the ray tracing is a rendering technique used to generate images by tracing a path of light in an image plane by using a pixel as a unit and simulating an effect of encounter with a virtual object, which can bring a high degree of visual reality, but cause high computational cost. In the field of personal computers (PCs) and consoles (Consoles) in which hardware acceleration can be easily implemented through hardware such as independent graphics cards, the ray tracing technology is increasingly widely applied. However, limited by a computing capability of a mobile terminal, when the ray tracing technology is applied to the mobile terminal, there are problems such as high power consumption and low execution efficiency, that is, it is difficult to implement on the mobile terminal.

For the above technical problems, a conception process of the technical solution of this application is as follows: It is found that in practice, real-time ray tracing has a strong gain effect in improving the reality of rendered images, currently covering shadows, reflections, ambient occlusion, translucent materials, and global illumination. All these algorithms need to calculate a large number of intersections between ray vectors and the three-dimensional scene. More light rays being traced indicates more intersections to be calculated, and more computing resources and computing time to be consumed. Therefore, it is thought that in a scene rendering process of real-time ray tracing on the mobile terminal, an amount of calculation and optimization efficiency can be reduced by reducing a number of emitted rays during ray tracing and reducing execution density of a ray tracing algorithm.

For example, in a three-dimensional scene update process, a degree of simplification of a to-be-rendered model may be determined by calculating a visible range proportion of the to-be-rendered model in a to-be-rendered picture, a ray emission density coefficient of the to-be-rendered model is determined with reference to a distance between the to-be-rendered model and the photographing apparatus, and finally ray emission density of the to-be-rendered model is finally determined with reference to a preset relationship table, thereby determining impact of the to-be-rendered model on image quality of a final rendering result.

It may be understood that, higher ray emission density of the to-be-rendered model indicates greater impact of the to-be-rendered model on the image quality of the final rendering result. In this case, in a rendering process of the to-be-rendered model, relatively high ray emission density is used for calculation. Lower ray emission density of the to-be-rendered model indicates less impact of the to-be-rendered model on the image quality of the final rendering result. Therefore, in the rendering process of the to-be-rendered model, relatively low ray emission density is used for calculation, so that the ray emission density during ray tracing is minimized without significantly changing image quality of rendering, to improve ray tracing calculation performance in an entire scene.

Further, it is found that during research, the API, namely, vulkan can provide lower CPU overheads and more direct GPU control. Therefore, the vulkan can be used in the ray tracing technology on the mobile terminal, and the ray tracing algorithm is executed on the mobile terminal based on a vulkan ray tracing acceleration structure, to improve rendering efficiency.

Based on the above technical conception process, embodiments of this application provide a rendering method. For a to-be-rendered model included in to-be-rendered model data, it is first determined, according to a render pipeline parameter in material information of the to-be-rendered model, whether the to-be-rendered model is rendered by using a ray tracing technology. If the to-be-rendered model is rendered by using the ray tracing technology, a ray emission density coefficient of the to-be-rendered model is determined according to a visible range proportion of the to-be-rendered model in a to-be-rendered picture and a distance between the to-be-rendered model and a photographing apparatus. A preset first relationship is queried, to determine ray emission density of the to-be-rendered model. The first relationship is a correspondence between the ray emission density coefficient and the ray emission density. Then, pixel rendering is performed on the to-be-rendered model with reference to a template value of the to-be-rendered model during drawcall. In the technical solution, by calculating the ray emission density of the to-be-rendered model, power consumption during rendering can be reduced, and rendering efficiency can be improved, while ensuring a rendering effect.

For example, FIG. 1 is a schematic diagram of a principle of ray tracing. As shown in FIG. 1, the schematic diagram of the principle includes a photographing apparatus (viewpoint), a virtual picture, an item, and a light source.

The principle of the ray tracing is: a process in which a light ray emitted from the photographing apparatus passes through a pixel position on a target rendered plane, enters a three-dimensional (3D) scene, and extends to the item, an intersection between the light ray and the item on the virtual picture is calculated, and then the intersection is shaded.

In practical application, the ray, when passing through the 3D scene, may be reflected from one item to another item (causing reflection), may be blocked by an item (causing a shadow), or may pass through a transparent or translucent item (simulating translucence or dielectric, such as glass or water). Therefore, if a material of the intersection between the light ray and the item is reflective, tracing can be continued at the intersection point in a reflection direction, and shading of the intersection point after reflection is continued to be obtained. In other words, in a ray tracing method, projection and the global illumination are calculated by tracing a propagation process of the ray in the three-dimensional scene, to render a two-dimensional image.

It may be understood that, the light source is a virtual light source arranged in a 3D space, configured to generate a lighting environment in the 3D space.

Figure 2:
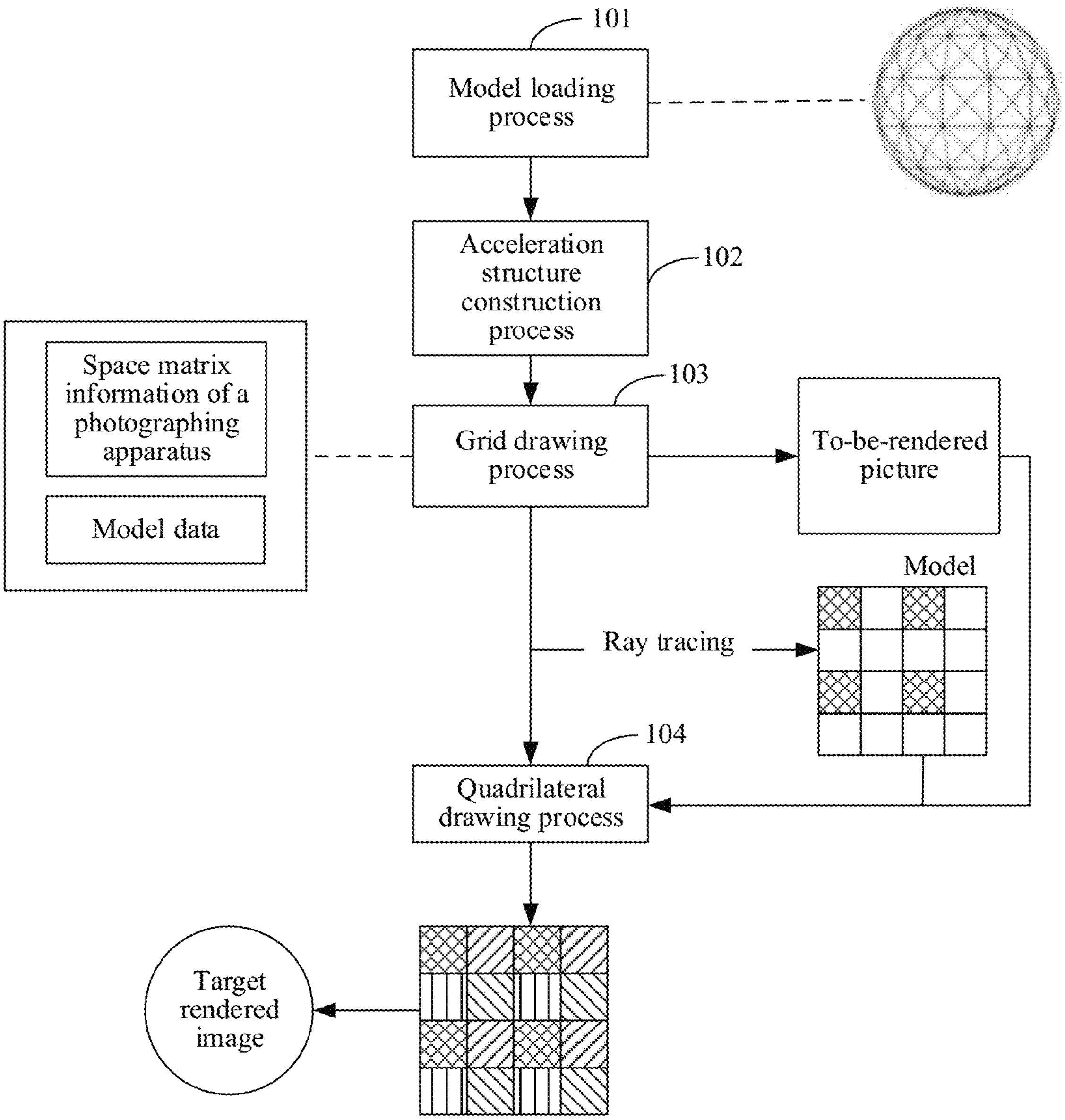
FIG. 2 is a schematic diagram of a process of a rendering method according to an embodiment of this application.

FIG. 2 is a schematic diagram of a process of a rendering method according to an embodiment of this application. As shown in FIG. 2, the schematic diagram of the process may include the following processes: a model loading process 101, an acceleration structure construction process 102, a grid drawing process 103, and a quadrilateral drawing process 104.

The model loading process 101 is mainly to load a model in the to-be-rendered picture based on the to-be-rendered data, determine whether to perform rendering by using the ray tracing technology according to the material information of the model, and assign a unique identifier id to a model on which rendering needs to be performed by using the ray tracing technology. The to-be-rendered data includes the to-be-rendered model and material data of the to-be-rendered model.

The acceleration structure construction process 102 is mainly to construct an acceleration structure to improve efficiency of subsequent rendering by using the ray tracing rendering technology.

The grid drawing process 103 is mainly to draw grids based on space matrix information of the photographing apparatus and model data, to obtain the to-be-rendered picture, determine ray emission density of the model for the model on which rendering needs to be performed by using the ray tracing technology, and perform rendering by using the ray tracing technology. For example, the ray emission density shown in FIG. 2 is equal to ¼, and one target pixel can be selected from each four pixels for performing pixel shading.

In the quadrilateral drawing process 104, a result image on which rendering is performed by using the ray tracing technology can be rendered as a whole based on the to-be-rendered picture, the ray emission density of the model, and a result determined in the grid drawing process 103. For example, color filling is performed on a hole pixel in the to-be-rendered picture, to generate a target rendered picture, and after it is determined that models in the target rendered picture are all filled with color data, a target rendered image corresponding to the to-be-rendered data is obtained.

It should be noted that, a product implementation form of embodiments of this application is program code included in machine learning and deep learning platform software and deployed on an electronic device. The program code in embodiments of this application may be stored in the electronic device. During execution, the program code is executed in a host memory and/or a GPU memory of the electronic device.

The electronic device in embodiments of this application may alternatively be any form of terminal device. For example, the terminal device may include a handheld device, an in-vehicle device, and the like with an image processing function. For example, some electronic devices are: a mobile phone (mobile phone), a tablet computer, a palmtop computer, a notebook computer, a mobile Internet device (MID), a wearable device, a virtual reality (VR) device, an augmented reality (AR) device, a wireless terminal in industrial control (industrial control), a wireless terminal in self-driving (self-driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a terminal device in a 5G network, a terminal device in a future evolved public land mobile network (PLMN), or the like. This is not limited in embodiments of this application.

As an example but not a limitation, in embodiments of this application, the electronic device may alternatively be a wearable device. The wearable device may also be referred to as a wearable smart device, and is a collective term for wearable devices developed by intelligently designing daily wearing based on a wearable technology, for example, glasses, gloves, a watch, clothing, and shoes. The wearable device is a portable device that can be directly worn or integrated into clothes or an accessory of a user. A wearable device is not merely a hardware device, but is used to implement a powerful function through software support, data exchange, and cloud interaction. In a broad sense, wearable smart devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, in embodiments of this application, the electronic device may alternatively be a terminal device in an Internet of Things (Internet of Things, IoT) system. The IoT is an important part of future information technology development. A main technical feature of the IoT is to connect an item to a network through a communication technology, to implement an intelligent network with a man-machine interconnection and interconnection between things.

The electronic device in embodiments of this application may also be referred to as: a terminal device, a user equipment (user equipment, UE), a mobile station (mobile station, MS), a mobile terminal (mobile terminal, MT), an access terminal, a user unit, a user station, a mobile site, a mobile station, a remote station, a remote terminal, a mobile device, a user terminal, a terminal, a wireless communication device, a user agent, a user apparatus, or the like.

In embodiments of this application, the electronic device or each network device includes a hardware layer, an operating system layer running over the hardware layer, and an application layer running over the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing through a process (process), for example, a Linux operating system, a Unix operating system, an Android operating system, an iOS operating system, or a windows operating system. The application layer includes applications such as a browser, an address book, word processing software, and instant messaging software.

Figure 3:
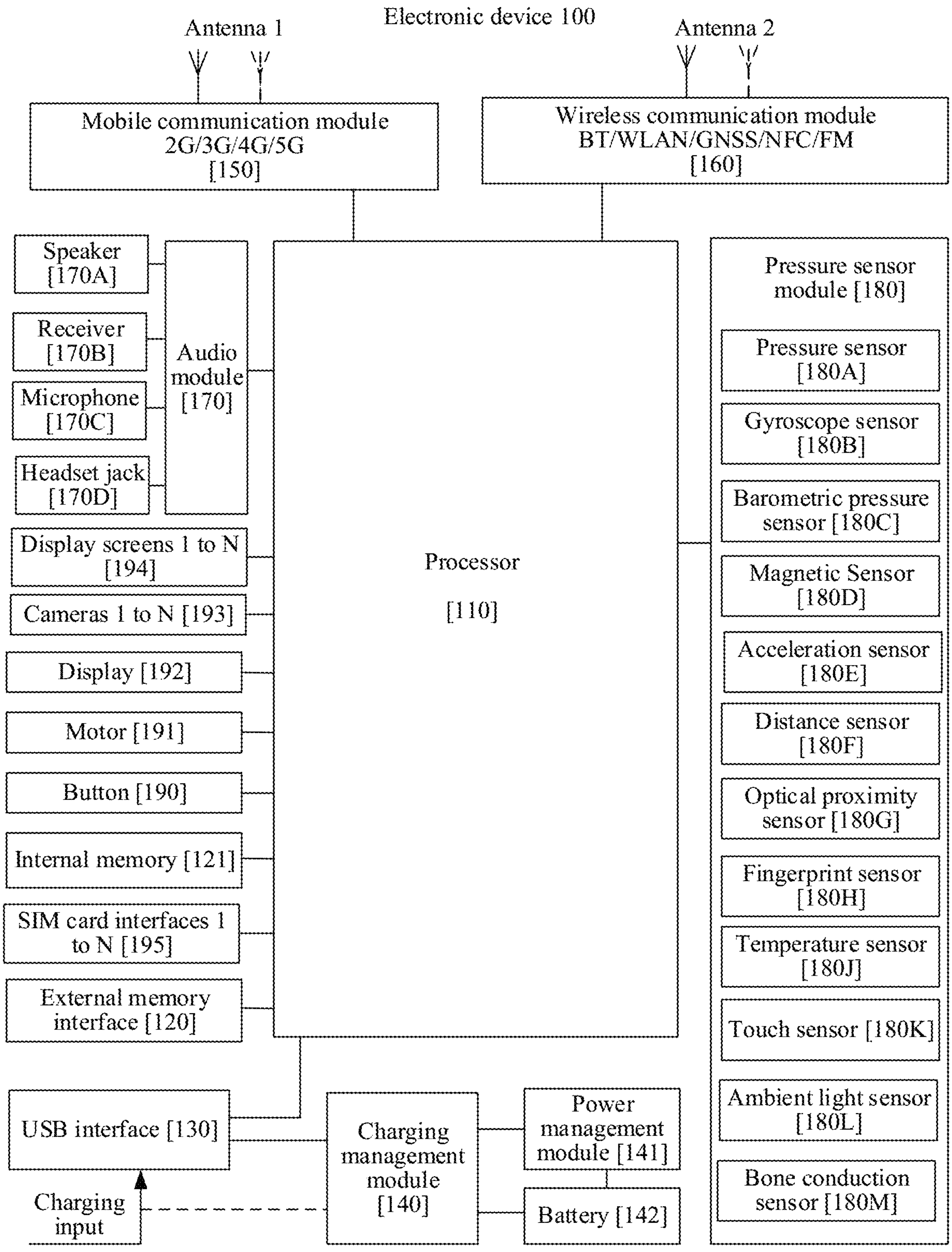
FIG. 3 is a schematic structural diagram of an electronic device.

To help better understand embodiments of this application, the following describes a structure of an electronic device in embodiments of this application:

FIG. 3 is a schematic structural diagram of an electronic device. As shown in FIG. 3, an electronic device 100 may include a processor 110, an external memory interface 120, an internal memory 121, a universal serial bus (universal serial bus, USB) interface 130, a charging management module 140, a power supply management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identification module (subscriber identification module, SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that a structure illustrated in embodiments of this application does not constitute a specific limitation on the electronic device 100. In some other embodiments of this application, the electronic device 100 may include more or fewer components than those shown in the figure, some components may be combined, some components may be split, or there may be different component arrangements. The illustrated components may be implemented by hardware, software, or a combination of software and hardware.

The processor 110 may include one or more processing units. For example, the processor 110 may include an application processor (application processor, AP), a modem, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like, or may be an application specific integrated circuit (application specific integrated circuit, ASIC), a field-programmable gate array (field-programmable gate array, FTGA), or other programmable logic devices, discrete gates, transistor logic devices, or discrete hardware components. Different processing units may be separate devices, or may be integrated into one or more processors.

The controller may generate an operation control signal based on an instruction operation code and a timing signal, to complete control of fetching an instruction and executing the instruction.

A memory may also be disposed in the processor 110, configured to store instructions and data. In some embodiments, the memory in the processor 110 is a cache. The memory may store instructions or data recently used or cyclically used by the processor 110. If the processor 110 needs to use the instructions or the data again, the processor may invoke the instructions or the data from the memory. Repeated access is avoided, and waiting time of the processor 110 is reduced, thereby improving efficiency of the system.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface, and the like.

It may be understood that an interface connection relationship between the modules illustrated in embodiments of this application is an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The electronic device 100 implements a display function by using the GPU, the display screen 194, the application processor, and the like. The GPU is a microprocessor for image processing and connects the display screen 194 to the application processor. The GPU is configured to perform mathematical and geometric calculation for graphics rendering. The processor 110 may include one or more GPUs, and the one or more GPUs execute program instructions to generate or change displayed information.

The display screen 194 is configured to display, for example, an image and a video. The display screen 194 may include a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diode, QLED), a low temperature polycrystalline oxide (low temperature polycrystalline oxide, LTPO), or the like. In some embodiments, the electronic device 100 may include 1 or N display screens 194, where N is a positive integer greater than 1.

The electronic device 100 may implement a photographing fuinction through the ISP, the camera 193, the video codec, the GPU, the display screen 194, the application processor, and the like.

The external memory interface 120 may be configured to be connected to an external memory card such as a Micro SD card, to expand a storage capability of the electronic device 100. The external storage card communicates with the processor 110 through the external memory interface 120, to implement a data storage function. For example, files such as music and a video are stored in the external memory card.

The internal memory 121 may be configured to store computer-executable program code, and the executable program code includes instructions. The internal memory 121 may include a program storage area and a data storage area. The program storage area may store an operating system, an application program required by at least one function (for example, a sound playback function and an image display function), and the like. The data storage area may store data (such as audio data or an address book) created during use of the electronic device 100. In addition, the internal memory 121 may include a high-speed random access memory, and may further include a non-volatile memory, for example, at least one magnetic disk storage device, a flash memory device, or a universal flash storage (universal flash storage, UFS). The processor 110 executes the instructions stored in the internal memory 121, and/or the instructions stored in the memory disposed in the processor, to perform various fuinction applications and data processing of the electronic device 100.

For example, the electronic device 100 may further include one or more of a button 190, a motor 191, an indicator 192, and an SIM card interface 195 (an eSIM card).

A software system of the electronic device 100 may use a layered architecture, an event-driven architecture, a microkernel architecture, a microservice architecture, a cloud architecture, or the like. In embodiments of this application, the software structure of the electronic device 100 is exemplarily described by using an Android system with a layered architecture as an example.

The technical solution of this application is described in detail with reference to specific embodiments below. It should be noted that the following several specific embodiments may be combined with each other, and same or similar concepts or processes may not be described repeatedly in some embodiments.

Figure 4:
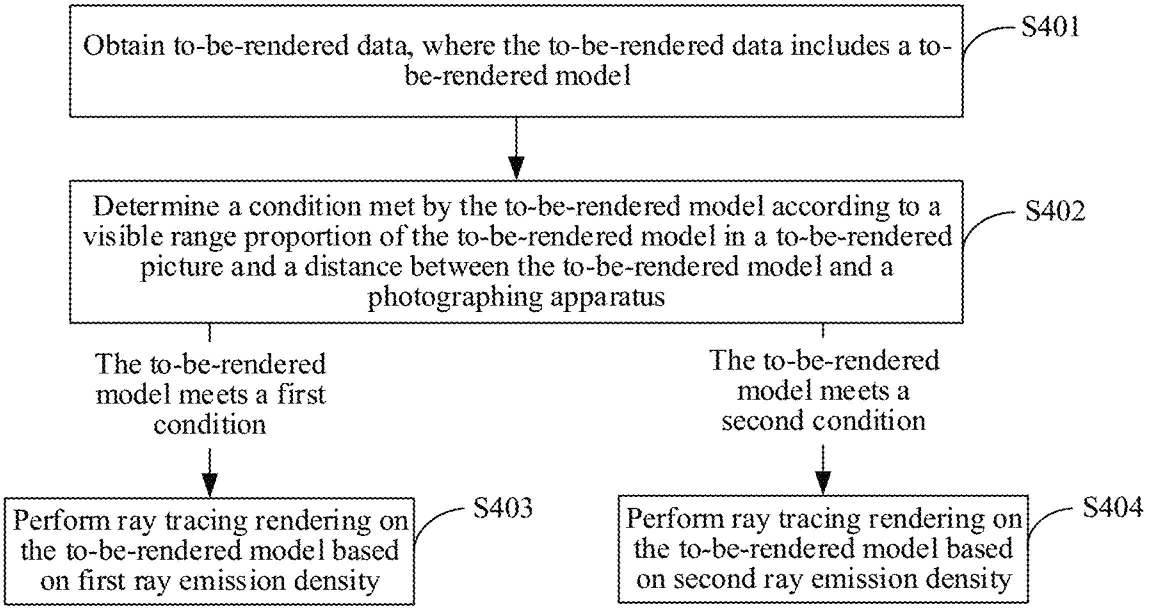
FIG. 4 is a schematic flowchart of a rendering method according to an embodiment of this application.

For example, FIG. 4 is a schematic flowchart of a rendering method according to an embodiment of this application. The rendering method may be applied to an electronic device. As shown in FIG. 4, in this embodiment, the rendering method may include the following steps:

S401. Obtain to-be-rendered data, where the to-be-rendered data includes a to-be-rendered model.

In practical application, different scenes correspond to different to-be-rendered data. By obtaining to-be-rendered data in a current scene, a to-be-rendered picture can be determined based on a field of view range and an orientation of a photographing apparatus in a device. In other words, in this embodiment, the photographing apparatus is a virtual camera in the electronic device, and the to-be-rendered picture is drawn through the photographing apparatus in an image rendering process based on the to-be-rendered data.

It may also be understood that, the to-be-rendered picture may be determined based on the field of view range and a direction of the photographing apparatus, that is, for the same to-be-rendered data, different to-be-rendered pictures may be obtained by changing the field of view range and/or the direction of the photographing apparatus.

In this embodiment, the rendering method may be applied to a scene including a plurality of frames of different pictures, the plurality of frames of different pictures may be sequentially rendered and generated in a time sequence, and pictures of different frames may include different numbers of to-be-rendered models. Embodiments of this application are described with reference to a frame of picture generated by drawing based on the to-be-rendered data and a to-be-rendered model included in the picture.

Optionally, the to-be-rendered data may be obtained by reading local data, or the to-be-rendered data may be obtained by receiving data sent by other devices. A manner of obtaining the to-be-rendered data is not limited in this embodiment.

S402. Determine a condition met by the to-be-rendered model according to a visible range proportion of the to-be-rendered model in the to-be-rendered picture and a distance between the to-be-rendered model and the photographing apparatus.

In practical application, image quality of the to-be-rendered model in the to-be-rendered picture is mainly affected by the visible range proportion of the to-be-rendered model in the to-be-rendered picture and the distance between the to-be-rendered model and the photographing apparatus. Therefore, before ray tracing is performed on the to-be-rendered model, impact of the visible range proportion of the to-be-rendered model in the to-be-rendered picture and the distance between the to-be-rendered model and the photographing apparatus on the image quality of the to-be-rendered picture, namely, the condition met by the to-be-rendered model, may first be determined, and then ray emission density of the to-be-rendered model is determined based on the condition.

A higher visible range proportion of the to-be-rendered model in the to-be-rendered picture indicates a greater contribution of the to-be-rendered model to the to-be-rendered picture, and calculated density of ray tracing needs to be higher correspondingly. A shorter distance between the to-be-rendered model and the photographing apparatus indicates a greater contribution of the to-be-rendered model to the to-be-rendered picture, and the calculated density of ray tracing needs to be higher correspondingly.

For example, in practical application, if the visible range proportion of the to-be-rendered model in the to-be-rendered picture is a first visible range proportion, and the distance between the to-be-rendered model and the photographing apparatus is a first distance, in this case, based on the first visible range proportion and the first distance, it can be calculated that the ray emission density of the to-be-rendered model is first ray emission density.

If the visible range proportion of the to-be-rendered model in the to-be-rendered picture is a second visible range proportion, and the distance between the to-be-rendered model and the photographing apparatus is a second distance, in this case, based on the second visible range proportion and the second distance, it can be calculated that the ray emission density of the to-be-rendered model is second ray emission density.

It may be understood that, when the first ray emission density is different from the second ray emission density, under different conditions, at least one of the visible range proportion and the distance of the to-be-rendered model is different. In other words, the first visible range proportion is different from the second visible range proportion, and/or the first distance is different from the second distance.

In an embodiment of this application, because a higher visible range proportion of the to-be-rendered model in the to-be-rendered picture indicates a greater contribution of the to-be-rendered model to the to-be-rendered picture, when the first visible range proportion is the same as the second visible range proportion, if the first distance is greater than the second distance, the first ray emission density is less than the second ray emission density.

In another embodiment of this application, because a shorter distance between the to-be-rendered model and the photographing apparatus indicates a greater contribution of the to-be-rendered model to the to-be-rendered picture, when the first distance is the same as the second distance, if the first visible range proportion is greater than the second visible range proportion, the first ray emission density is greater than the second ray emission density.

In this embodiment of this application, the ray emission density for performing ray tracing rendering can be determined based on the condition met by the to-be-rendered model. Specifically, when the to-be-rendered model meets a first condition, S403 is performed; or when the to-be-rendered model meets a second condition, S404 is performed.

S403. Perform ray tracing rendering on the to-be-rendered model based on the first ray emission density.

In this step, the first ray emission density may be understood as that in pixels corresponding to the to-be-rendered model, a proportion of pixels rendered by using ray tracing is a first proportion. For example, it is assumed that the first ray emission density is equal to ¼, in this case, one pixel in each four pixels is rendered by using ray tracing, and for other pixels, color filling is performed in other manners.

In other words, if the to-be-rendered model meets the first condition, that is, the visible range proportion of the to-be-rendered model in the to-be-rendered picture is the first visible range proportion, and the distance between the to-be-rendered model and the photographing apparatus is the first distance, it can be calculated that the ray emission density of the to-be-rendered model is the first ray emission density. Correspondingly, ray tracing rendering may be performed on the to-be-rendered model based on the first ray emission density, to obtain a scene semantic image and a ray tracing rendering result image corresponding to the to-be-rendered model.

S404. Perform ray tracing rendering on the to-be-rendered model based on the second ray emission density.

In this step, the second ray emission density may be understood as that in pixels corresponding to the to-be-rendered model, a proportion of pixels rendered by using ray tracing is a second proportion. For example, it is assumed that the second ray emission density is equal to ¾, in this case, three pixels in each four pixels are rendered by using ray tracing, and for other pixels, color filling may be performed in other manners.

In other words, if the to-be-rendered model meets the second condition, that is, the visible range proportion of the to-be-rendered model in the to-be-rendered picture is the second visible range proportion, and the distance between the to-be-rendered model and the photographing apparatus is the second distance, it can be calculated that the ray emission density of the to-be-rendered model is the second ray emission density. Correspondingly, ray tracing rendering may be performed on the to-be-rendered model based on the second ray emission density, to obtain the scene semantic image and the ray tracing rendering result image corresponding to the to-be-rendered model.

In this embodiment of this application, when the first visible range proportion is the same as the second visible range proportion, if the first distance is greater than the second distance, the first ray emission density is less than the second ray emission density.

In embodiments of this application, after using the technical solution in this application to perform ray tracing rendering on the to-be-rendered model in the to-be-rendered picture, the electronic device can generate a target rendered picture, performs color filling on a to-be-rendered model in the target rendered picture, and performs rendering and hole filling on a model that is not rendered in the target rendered picture, to generate the target rendered image.

In embodiments of this application, the to-be-rendered data is obtained, and the to-be-rendered data includes the to-be-rendered model. When the to-be-rendered model meets the first condition, ray tracing rendering is performed on the to-be-rendered model based on the first ray emission density, and when the to-be-rendered model meets the second condition, ray tracing rendering is performed on the to-be-rendered model based on the second ray emission density. The to-be-rendered model is located in the to-be-rendered picture, and the to-be-rendered picture is drawn through the photographing apparatus based on the to-be-rendered data in a rendering process. That is, when the visible range proportion of the to-be-rendered model in the to-be-rendered picture changes and/or the distance between the to-be-rendered model and the photographing apparatus changes, the ray emission density of the to-be-rendered model may be changed, to adaptively adjust a proportion of pixels on which ray tracing is performed. The power consumption during rendering is reduced, and the rendering efficiency is improved, while ensuring the rendering effect.

Figure 5:
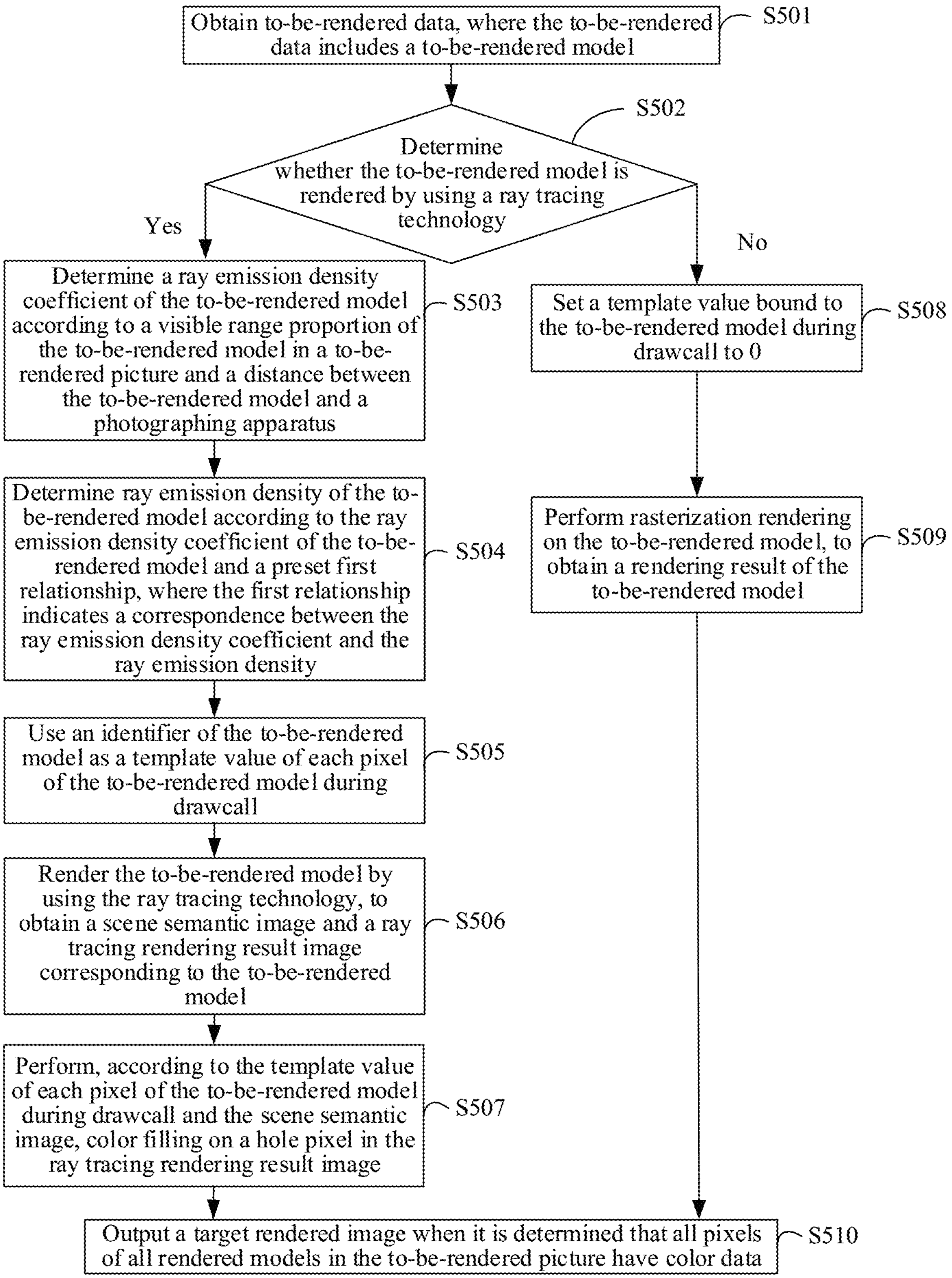
FIG. 5 is a schematic flowchart of another rendering method according to an embodiment of this application.

For example, based on the above embodiments, FIG. 5 is a schematic flowchart of another rendering method according to an embodiment of this application. As shown in FIG. 5, in this embodiment, the rendering method may include the following steps:

S501. Obtain to-be-rendered data, where the to-be-rendered data includes a to-be-rendered model.

The rendering method in this embodiment may be applied in a scene including a plurality of frames of different pictures, the plurality of frames of different pictures may be sequentially rendered and generated in a time sequence, and pictures of different frames may include different numbers of to-be-rendered models. Embodiments of this application are described with reference to a frame of picture corresponding to the to-be-rendered data.

It may be understood that, in practical application, each frame of picture may include one or more to-be-rendered models. That a to-be-rendered picture includes a to-be-rendered model is used for description in this embodiment, and a number of the to-be-rendered models is not limited, which may be specifically determined according to actual scenes.

Optionally, in a scene update process, for a current scene, to-be-rendered data of the current scene may be obtained, and the to-be-rendered model in the to-be-rendered picture is determined based on model data in the to-be-rendered data.

Optionally, the rendering method is applicable to applications related to graphics rendering, for example, game applications and virtual simulation applications. It may be understood that, in a process of downloading and installing an application, related to-be-rendered data in the application is downloaded and stored simultaneously. Correspondingly, in a process of running the application, the to-be-rendered data may be obtained by loading data related to the application.

Optionally, in a process of browsing a web page, a data request may be sent to a server, and the to-be-rendered data is obtained by receiving data sent by the server.

In other words, in practical application, the to-be-rendered data may be obtained by reading local data, or the to-be-rendered data may be obtained by receiving data sent by other devices. A manner of obtaining the to-be-rendered data is not limited in this embodiment.

It may be understood, in this embodiment, the to-be-rendered data may include a model in a three-dimensional scene and attribute information of the model. For example, the model may be a three-dimensional item or a virtual scene or an item strictly defined by using a language or a data structure, including information such as geometry, a viewpoint, a texture, and lighting, for example, models of the sky, houses, people, and trees. The attribute information of the model may include a color, a material, a size, and other attribute information.

S502. Determine whether the to-be-rendered model is rendered by using the ray tracing technology. If the to-be-rendered model is rendered by using the ray tracing technology, S503 to S507 are performed; or if the to-be-rendered model is not rendered by using the ray tracing technology, S508 and S509 are performed.

In a three-dimensional scene update process, because ray tracing has a strong gain effect in improving reality of a rendered picture, however, because a large number of intersections between ray vectors and the three-dimensional scene need to be calculated, more rays are traced, and more calculation resources and calculating time are consumed. Therefore, for visual reality of a target picture and a requirement of reducing resource consumption, whether each model is rendered by using the ray tracing technology can be specified in the material information of the model. Therefore, in this embodiment, the to-be-rendered model is loaded based on the to-be-rendered data. However, before the to-be-rendered model is rendered, whether the to-be-rendered model is rendered by using the ray tracing technology is first determined.

In practical application, the to-be-rendered data further includes material data of the to-be-rendered model, which may also be understood as the attribute information of the model. Therefore, whether the model is rendered by using the ray tracing technology may be determined based on the attribute information of the model. Specifically, the material information carried in the model includes a model material file. A render pipeline parameter RenderPipeline is set in the model material file, and a value of the render pipeline parameter RenderPipeline may be RASTER or RAYTRACING. If the render pipeline parameter RenderPipeline is equal to RASTER, it indicates that the model is rendered by using a conventional rendering technology, that is, not using the ray tracing technology. If the render pipeline parameter RenderPipeline is equal to RAYTRACING, it indicates that the model is rendered by using the ray tracing technology.

Correspondingly, in embodiments of this application, after the to-be-rendered model is loaded based on the to-be-rendered data, the value of the render pipeline parameter of the to-be-rendered model can be determined by querying the model material file in the material information carried in the to-be-rendered model. In this way, it can be determined, based on the value of the render pipeline parameter of the to-be-rendered model, whether to render the to-be-rendered model by using the ray tracing technology.

In an example, if the render pipeline parameter RenderPipeline of the to-be-rendered model is equal to RASTER, it indicates that the to-be-rendered model is not rendered by using the ray tracing technology. Therefore, solutions in S508 and S509 are used. If the render pipeline parameter RenderPipeline of the to-be-rendered model is equal to RAYTRACING, it indicates that the to-be-rendered model is rendered by using the ray tracing technology. In this case, solutions in S503 to S507 may be used.

S503. Determine a ray emission density coefficient of the to-be-rendered model according to a visible range proportion of the to-be-rendered model in the to-be-rendered picture and a distance between the to-be-rendered model and a photographing apparatus.

The visible range proportion of the to-be-rendered model in the to-be-rendered picture is equal to a ratio of bounding sphere information (namely, a number of pixels covered by a bounding sphere) of the to-be-rendered model to a total pixel number of the to-be-rendered picture.

In this embodiment, the number of pixels covered by the bounding sphere of the to-be-rendered model may be determined in the following manner: World space coordinates (X, Y, Z) of the to-be-rendered model and vertex data of the to-be-rendered model are first determined based on the to-be-rendered data. Bounding sphere center coordinates and a radius of the bounding sphere of the to-be-rendered model in a three-dimensional space are determined based on the bounding sphere formed by using the world space coordinates (X, Y, Z) and the vertex data. Then space coordinates (X0, Y0, Z0) and (X1, Y1, Z1) of two end points of any diameter of the bounding sphere are obtained, and the space coordinates (X0, Y0, Z0) and (X1, Y1, Z1) of the two endpoints are respectively multiplied by a projection matrix of the photographing apparatus, to obtain standard device space coordinates (x0, y0, z0) and (x1, y1, z1). A radius pixel number R of the bounding sphere in the to-be-rendered picture is obtained by calculating a modulus of pixels between (x0, y0, z0) and (x1, y1, z1), and then the number of pixels covered by the bounding sphere of the to-be-rendered model can be determined as 4πRR.

A pixel number of the to-be-rendered picture can be calculated according to a width Width and a height Height of a resolution of the to-be-rendered picture. Therefore, in this embodiment, the visible range proportion of the to-be-rendered model in the to-be-rendered picture is equal to 4πRR/(Width*Height).

It may be understood that, in practical application, a higher visible range proportion of the to-be-rendered model in the to-be-rendered picture indicates a greater contribution of the to-be-rendered model to the to-be-rendered picture, and calculated density of ray tracing needs to be higher correspondingly.

Optionally, the bounding sphere information of the to-be-rendered model may alternatively be replaced with axis-aligned bounding box (Axis-aligned bounding box, AABB) information of the to-be-rendered model. Specifically, the AABB information of the to-be-rendered model may be information about a pixel range covered by an AABB of the to-be-rendered model projected onto a screen or information about a pixel range covered by an oriented bounding box (oriented bounding box, OBB) projected onto the screen, which is not limited in this embodiment.

In this embodiment, the distance between the to-be-rendered model and the photographing apparatus may be obtained according to the world space coordinates (X, Y, Z) of the to-be-rendered model in the space matrix and world space coordinates (X0, Y0, Z0) of the photographing apparatus. Specifically, by calculating a modulus of a vector formed by the world space coordinates (X, Y, Z) of the to-be-rendered model in the space matrix and world space coordinates (X0, Y0, Z0) of the photographing apparatus, the distance Distance between the to-be-rendered model and the photographing apparatus is equal to $\sqrt{((X0-X)^2+(Y0-Y)^2+(Z0-Z)^2)}$.

In practical application, the distance between the to-be-rendered model and the photographing apparatus may further be represented by a level of detail (LOD). The LOD is used in a scene of describing a video game, a to-be-rendered model closer to the photographing apparatus can present more polygons than a to-be-rendered model farther from the photographing apparatus. In other words, resource allocation for rendering the to-be-rendered model can be determined according to a position and importance of the to-be-rendered model in the to-be-rendered picture. A number of surfaces and a degree of detail of a non-important to-be-rendered model are reduced, to achieve highly efficient rendering operation. It may be understood that a lower LOD, namely, a shorter distance between the to-be-rendered model and the photographing apparatus, indicates a greater contribution of the to-be-rendered model to the to-be-rendered picture, and the calculated density of ray tracing needs to be higher correspondingly.

In this embodiment, because both the visible range proportion of the to-be-rendered model in the to-be-rendered picture and the distance between the to-be-rendered model and the photographing apparatus make contributions to the to-be-rendered picture, to calculate the ray emission density coefficient of the to-be-rendered model, a first weight coefficient and a second weight coefficient preset in the device may be queried, and weighted summation is performed on the distance between the to-be-rendered model and the photographing apparatus and the visible range proportion of the to-be-rendered model in the to-be-rendered picture according to the first weight coefficient and the second weight coefficient, to obtain the ray emission density coefficient when the to-be-rendered model is rendered by using the ray tracing technology.

The first weight coefficient is a weight coefficient of the distance between the to-be-rendered model and the photographing apparatus, the second weight coefficient is a weight coefficient of the visible range proportion of the to-be-rendered model in the to-be-rendered picture, and a sum of the first weight coefficient and the second weight coefficient is equal to 1. The first weight coefficient and the second weight coefficient are determined according to importance of the distance between the to-be-rendered model and the photographing apparatus and the visible range proportion of the to-be-rendered model in the to-be-rendered picture, and preset in the device.

In an optional embodiment of this application, the first weight coefficient is optionally equal to 0.3, and the second weight coefficient is optionally equal to 0.7. In other words, a weight of 0.7 may be assigned to the indicator visible range proportion of the to-be-rendered model in the to-be-rendered picture, and a weight of 0.3 may be assigned to the indicator distance between the to-be-rendered model and the photographing apparatus, to perform weighted summation on the two indicators, and calculate the ray emission density coefficient of the to-be-rendered model.

S504. Determine the ray emission density of the to-be-rendered model according to the ray emission density coefficient of the to-be-rendered model and a preset first relationship, where the first relationship indicates a correspondence between the ray emission density coefficient and the ray emission density.

In this embodiment, the first relationship between the ray emission density coefficient and the ray emission density of models during rendering by using the ray tracing technology is preset in the device. For example, a relationship table representing a relationship between the ray emission density coefficient and the ray emission density is preset in the device, after the ray emission density coefficient of the to-be-rendered model is determined, the ray emission density of the to-be-rendered model can be determined by querying the relationship table.

For example, the ray emission density represents a relationship between a pixel of a model and an emitted ray. For example, the ray emission density being equal to 0.5 represents that a ray is emitted at an interval of one pixel, and the ray emission density being equal to 0.2 represents that a ray is emitted at an interval of three pixels.

It may be understood, in this embodiment, the ray emission density of the to-be-rendered model may be used as a basis for model pixel shading frequency in a subsequent fragment shader stage. The model pixel shading frequency indicates one of every several pixels in all pixels of the to-be-rendered model.

S505. Use an identifier of the to-be-rendered model as a template value of each pixel of the to-be-rendered model during drawcall.

In this embodiment, a template value of the to-be-rendered model during drawcall may be set according to the identifier of the to-be-rendered model and whether to perform rendering by using the ray tracing technology.

In an optional embodiment, if the to-be-rendered model is rendered by using the ray tracing technology, the identifier (ID) of the to-be-rendered model may be bound as a template value of the to-be-rendered model during drawcall (drawcall), that is, a template value of each of the pixels of the to-be-rendered model during drawcall (drawcall) is equal to the identifier of the to-be-rendered model.

S506. Render the to-be-rendered model by using the ray tracing technology, to obtain a scene semantic image and a ray tracing rendering result image corresponding to the to-be-rendered model.

The scene semantic image is used for identifying a model to which a pixel belongs, and the ray tracing rendering result image carries a hole pixel.

In this embodiment, when ray tracing rendering is performed on the to-be-rendered model based on the ray emission density, the ray tracing rendering result image of the to-be-rendered model can be obtained, where the ray tracing rendering result image carries the hole pixel. Then color filling can be performed on the hole pixel in the ray tracing rendering result image according to the template value of each pixel of the to-be-rendered model during drawcall and the scene semantic image of the to-be-rendered model. The scene semantic image is used for identifying a model to which a pixel belongs.

It may be understood, in this embodiment, when it is determined that the to-be-rendered model is rendered by using the ray tracing technology, a bound vulkan ray tracing acceleration structure may be invoked to execute a ray tracing algorithm, to output rendered color data to RGB three channels of a target pixel.

Figure 6:
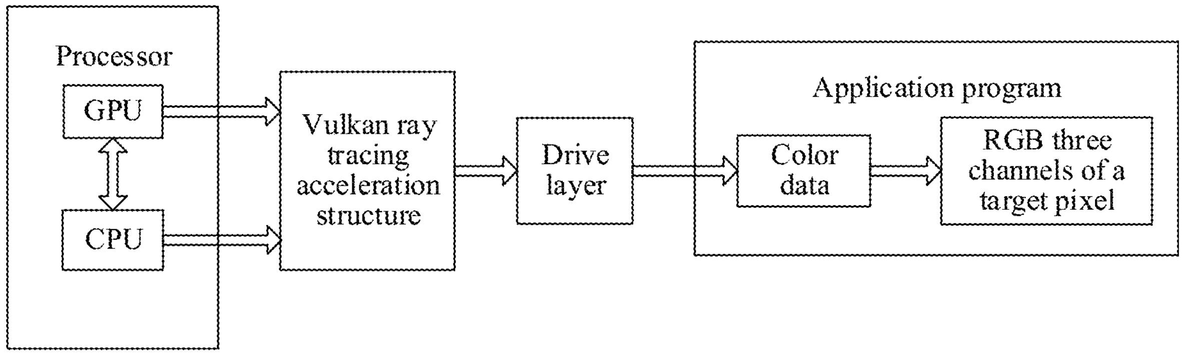
FIG. 6 is a schematic diagram of a principle of performing ray tracing based on a vulkan ray tracing acceleration structure.

For example, FIG. 6 is a schematic diagram of a principle of performing ray tracing based on a vulkan ray tracing acceleration structure. In practical application, it is assumed that an entity executing rendering by using the ray tracing technology is a processor, as shown in FIG. 6, the schematic diagram of the principle may include the processor, the vulkan ray tracing acceleration structure, a drive layer, and an application program. The processor may include a CPU and/or a GPU.

In this embodiment, the CPU or the GPU in the processor may directly invoke the vulkan ray tracing acceleration structure to execute ray tracing rendering, and the CPU and the GPU may alternatively invoke the vulkan ray tracing acceleration structure to execute ray tracing rendering after information interaction, which is not limited in this embodiment.

Optionally, the drive layer is a driver implementation provided for the vulkan ray tracing acceleration structure based on a GPU architecture, and the application program is a program that can invoke the vulkan to execute graphics or computing works.

In this embodiment, the processor may determine the target pixel to be shaded in the to-be-rendered model according to the ray emission density of the to-be-rendered model, and then invoke the vulkan ray tracing acceleration structure to execute the ray tracing algorithm, to output the color data of the target pixel to the RGB three channels of the target pixel for being directly used in the fragment shader stage.

It may be understood that, in embodiments of this application, the target pixel on which ray tracing rendering needs to be performed in the to-be-rendered model may be determined based on the ray emission density and a preset shaded pixel arrangement, then ray tracing rendering is performed on the target pixel, to obtain the color data of the target pixel, and finally, the color data is outputted to a position of the target pixel, to obtain the ray tracing rendering result image of the to-be-rendered model.

It may be understood that, the shaded pixel arrangement indicates position arrangement information of a pixel rendered by using ray tracing. Correspondingly, in this embodiment, when the target pixel to be shaded in the to-be-rendered model is determined based on the ray emission density, a shape arrangement of the position of the target pixel corresponding to the ray emission density may be first determined based on the preset shaded pixel arrangement, and then the position of the target pixel to be shaded in the to-be-rendered model is determined based on the shape arrangement of the position of the target pixel.

For example, referring to FIG. 2, when the ray emission density of the to-be-rendered model is 0.25, one target pixel is selected from each four pixels for pixel shading. In this case, the positions of the target pixels may be arranged in a "Z" shape, or may be arranged in other shapes, for example, a "=" shape. A position arrangement and the shape arrangement of the target pixel are not limited in embodiments of this application, which may be set according to actual requirements.

It may be understood that, the position of the target pixel may be determined based on a "Z"-shaped arrangement, however, a specific position of the target pixel in the to-be-rendered picture may be determined according to settings. For example, in FIG. 2, the to-be-rendered model with pixels arranged 4×4, when the ray emission density is 0.25, pixels at intersections between the first row and the first column, the first row and the third column, the third row and the first column, and the third row and the third column may be selected to be rendered, or pixels at intersections between the first row and the second column, the first row and the fourth column, the third row and the second column, and the third row and the fourth row may be selected to be rendered, or pixels at intersections between the second row and the first column, the second row and the third column, the fourth row and the first column, and the fourth row and the third column may be selected to be rendered. Certainly, the target pixel may also be determined in such manner, which is not limited in this embodiment, and details are not repeated herein.

Optionally, in a process of executing the ray tracing algorithm on the to-be-rendered model based on the bound vulkan ray tracing acceleration structure, for the to-be-rendered model, it may be calculated, based on the determined position of the target pixel, whether a currently processed pixel needs to be shaded normally in the fragment shader (fragment shader) stage. If the currently processed pixel needs to be shaded normally, the ray tracing rendering algorithm in the fragment shader is executed, and color data of the pixel is outputted to RGB three channels of the pixel. If the currently processed pixel does not need to be shaded normally, an operation is abandoned, and a template value of the pixel is outputted to a template buffering position. Therefore, a generated ray tracing rendering result only renders a part of pixels of the to-be-rendered model, so that there is a hole pixel in the target rendered picture (namely, the ray tracing rendering result image) after ray tracing is performed on the to-be-rendered model. The template buffering position is a special memory area in a graphics rendering frame, for storing a template value of each model to which an identifier is assigned. The template value is used for distinguishing between different models.

In other words, in the fragment shader of the to-be-rendered model, whether the currently processed pixel is used for color information of emitted rays for pixels can be calculated according to the ray emission density, the shape arrangement of the position of the target pixel, and coordinates of the currently processed pixel that are determined in the above steps. If yes, the color data of the current pixel is calculated, and the color data is outputted to the current pixel. If not, exit.

Correspondingly, after ray tracing rendering in S506, the ray tracing rendering result image (that is, a colored image) with the hole pixel and the scene semantic image that identifies which model a pixel belongs to may be outputted. Therefore, in embodiments of this application, color filling may alternatively be performed on the hole pixel in the ray tracing rendering result image based on the scene semantic image, so that color of the target rendered image finally obtained is complete.

S507. Perform, according to the template value of each pixel of the to-be-rendered model during drawcall and the scene semantic image, color filling on the hole pixel in the ray tracing rendering result image.

Optionally, for each pixel in the ray tracing rendering result image, the pixel is filled and rendered sequentially according to postprocessing logic. In other words, a color value of each hole pixel in the ray tracing rendering result image is calculated, and fills a target position, to generate a finally real-time ray tracing rendering result.

Figure 7:
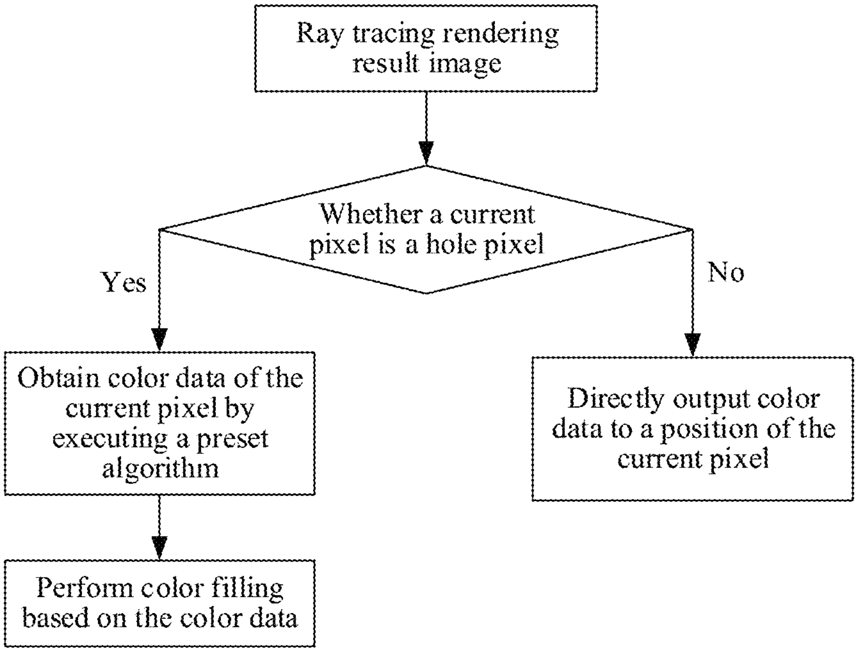
FIG. 7 is a schematic diagram of a principle of filling a hole pixel in a ray tracing rendering result image.

For example, FIG. 7 is a schematic diagram of a principle of filling a hole pixel in a ray tracing rendering result image. As shown in FIG. 7, sampling the ray tracing rendering result image generated in S506, for any pixel in the ray tracing rendering result image, it is determined whether the current pixel that is sampled is a hole pixel, that is, it is determined whether the current pixel is a pixel on which ray tracing is performed.

Refer to FIG. 7. In an optional embodiment, if the current pixel is not a hole pixel, that is, the ray tracing algorithm is executed on the current pixel, and there is color data, in this case, the color data can be directly outputted to a position of the current pixel.

Refer to FIG. 7. In an optional embodiment, if the current pixel is a hole pixel, that is, the ray tracing algorithm is not performed on the current pixel, and there is not the color data, in this case, color data of the current pixel can be obtained by executing a preset algorithm, and color filling is performed based on the color data.

Specifically, when the current pixel is a hole pixel, a reference pixel having a same template value with the hole pixel on the ray tracing rendering result image is first determined based on the template value of each pixel of the to-be-rendered model during drawcall and the scene semantic image, where the reference pixel is a pixel that has color data; and then color filling is performed on the hole pixel by using the color data of the reference pixel.

Optionally, a specific method of obtaining the color data of the current pixel by executing the preset algorithm, that is, determining the reference pixel of the hole pixel, and rendering based on this is: obtaining texture coordinates of the hole pixel and texture coordinates of a first pixel that already has color data on the ray tracing rendering result image according to the scene semantic image of the to-be-rendered model, then querying, based on the texture coordinates of the hole pixel and the texture coordinates of the first pixel, a template buffering position, and determining a template value of the hole pixel and a template value of the first pixel, where the template buffering position is used for storing the template value of each pixel of the to-be-rendered model during drawcall; and determining whether the template value of the hole pixel is consistent with the template value of the first pixel; if the template value of the hole pixel is consistent with the template value of the first pixel, determining that the hole pixel and the first pixel belong to a same model, and in this case, determining that the first pixel is the reference pixel of the hole pixel, so that the color data of the first pixel can be outputted to the position of the hole pixel, to render the hole pixel; or if the template value of the hole pixel is not consistent with the template value of the first pixel, traversing other pixels that already have color data on the ray tracing rendering result image, until the reference pixel having the same template value with the hole pixel is identified. For example, texture coordinates of a second pixel that already has color data is obtained, and the above determining process is performed, until a pixel that already has color data belonging to a same model with the second pixel is found, and the pixel is used as the reference pixel. In this case, color filling of the hole pixel is implemented.

It may be understood, in this embodiment, the first pixel is different from the second pixel.

S508. Set a template value bound to the to-be-rendered model during drawcall to 0.

In an optional embodiment, if the to-be-rendered model is not rendered by using the ray tracing technology, the template value bound to the to-be-rendered model during drawcall may be set to 0, that is, the template value bound to the to-be-rendered model during drawcall is set to 0.

Optionally, in embodiments of this application, if the to-be-rendered model is not rendered by using the ray tracing technology, S509 may be performed.

S509. Perform rasterization rendering on the to-be-rendered model, to obtain a rendering result of the to-be-rendered model.

It may be understood that, rasterization rendering is actually a type of common rendering. For a to-be-rendered model not rendered by using ray tracing, the to-be-rendered model may be rendered through rasterization rendering, to obtain color data of the to-be-rendered model, and the color data is rendered to each pixel of the to-be-rendered model.

Optionally, after common rendering is used, a template buffering position of each pixel of the to-be-rendered model during drawcall may be marked as 0.

It may be understood that, all of other models in the to-be-rendered picture may be rendered by using the method according to S501 to S509, which is not repeated in this embodiment.

S510. Output the target rendered image when it is determined that all pixels of all to-be-rendered models in the to-be-rendered picture have color data.

Optionally, the target rendered image can be obtained through steps of S501 to S509.

In the rendering method provided in embodiments of this application, for the to-be-rendered model in the to-be-rendered picture corresponding to the to-be-rendered data, when it is determined that the to-be-rendered model needs to be rendered by using the ray tracing technology, the ray emission density coefficient of the to-be-rendered model is first determined according to the visible range proportion of the to-be-rendered model in the to-be-rendered picture and the distance between the to-be-rendered model and the photographing apparatus, then the ray emission density of the to-be-rendered model is determined based on the preset first relationship, and the ray tracing technology is performed to render the to-be-rendered model based on the ray emission density. In the technical solution, when the to-be-rendered model is rendered by using the ray tracing technology, a number of emitted rays of ray tracing can be minimized, calculation consumption of ray tracing can be minimized, and the rendering efficiency can be improved, while ensuring the rendering effect.

Optionally, in embodiments of this application, for a scene having a dynamic characteristic, such as game scenes, the scene is updated constantly. In a scene update process, the model leaves the scene and becomes invisible, or enters the scene and becomes visible. Consequently, a queue of visible models in the to-be-rendered picture dynamically changes. Therefore, identifiers of models need to be reassigned according to the queue of visible models in a current scene.

Figure 8:
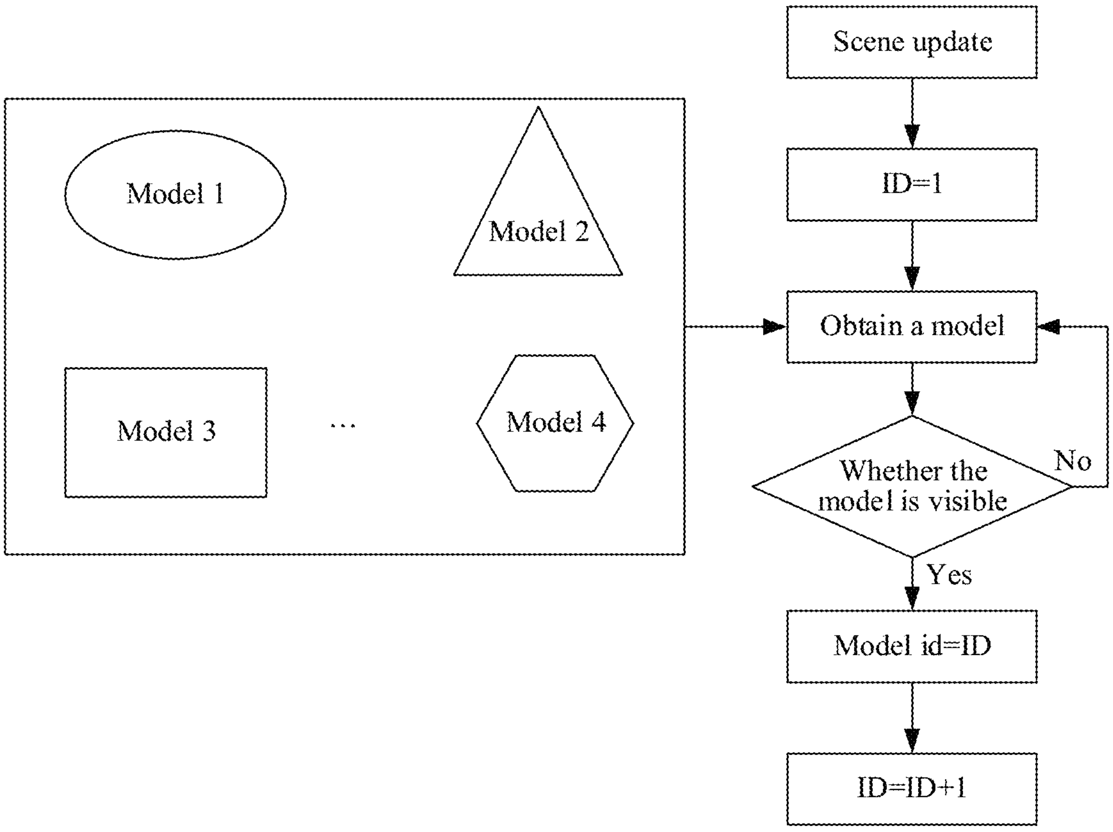
FIG. 8 is a schematic flowchart of update of a model in a to-be-rendered picture corresponding to to-be-rendered data.

For example, FIG. 8 is a schematic flowchart of update of a model in a to-be-rendered picture corresponding to to-be-rendered data. As shown in FIG. 8, in this embodiment, when the scene is updated, identifiers of the models start from a serial number 1, that is, ID=1.

For example, as shown in FIG. 8, it is assumed that models included in the to-be-rendered picture of the current scene include: a model 1, a model 2, a model 3, . . . and a model N. The models may be sequentially obtained from the to-be-rendered picture, to determine whether a currently obtained model is visible.

In an example, when the obtained model is visible, a current model identifier serial number is assigned to the current model, that is, an identifier of the current model is controlled to be equal to the current model identifier serial number (namely, a model id=ID). Correspondingly, the model identifier serial number is added by 1 (ID=ID+1), and the step of obtaining models from the to-be-rendered picture is performed.

In another example, when the obtained model is invisible, the step of obtaining models from the to-be-rendered picture is directly performed.

In embodiments of this application, during drawcall of a model, a unique positive integer identifier is assigned to each model, and is used as a template value of rendering. The template value is outputted to a template buffer while colors of the model is drawn, which can meet a requirement of constantly updating a scene in the scene having a dynamic characteristic, and improve reality of a picture.

The foregoing mainly describes the solutions according to embodiments of this application from a method perspective. To implement the foregoing functions, corresponding hardware structures and/or software modules for performing the functions are included. A person skilled in the art should be easily aware that the method steps in the examples described with reference to embodiments disclosed in this specification may be implemented in this application in a form of hardware or a combination of hardware and computer software. Whether a function is performed by hardware or computer software driving hardware depends on particular applications and design constraints of the technical solutions. A person skilled in the art can use different methods to implement the described functions for each particular application, but it should not be considered that the implementation goes beyond the scope of embodiments of this application.

In embodiments of this application, an apparatus for implementing a rendering method may be divided into functional modules based on the foregoing method examples, for example, each functional module may be obtained through division for each corresponding function, or two or more functions may be integrated into one processing module. An integrated module may be implemented in a form of hardware or may be implemented in a form of a software function module. It should be noted that in embodiments of this application, the module division is an example, and is merely logical function division, and there may be other division manners during actual implementation.

Figure 9:
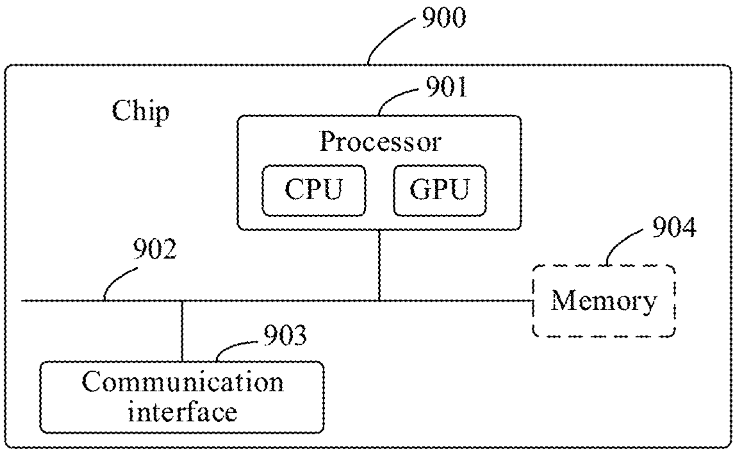
FIG. 9 is a schematic structural diagram of a chip according to an embodiment of this application.

For example, FIG. 9 is a schematic structural diagram of a chip according to an embodiment of this application. As shown in FIG. 9, a chip 900 includes one or more than two (including two) processors 901, a communication line 902, a communication interface 903, and a memory 904.

The processor 901 is implemented by using a GPU, or the processor 901 is implemented by using a CPU and a GPU.

In some implementations, the memory 904 stores the following elements: an executable module or a data structure, or subsets thereof, or extended sets thereof.

The method described in embodiments of this application may be applied to the processor 901 or implemented by the processor 901. The processor 901 may be an integrated circuit chip having a capability of processing a signal. In an implementation process, the steps of the foregoing method may be completed by using a hardware-integrated logic circuit in the processor 901 or instructions in a form of software. The processor 901 may implement or perform various methods, steps, and logic block diagrams disclosed in embodiments of this application.

The steps of the methods disclosed with reference to embodiments of this application may be directly performed and completed by using a hardware decoding processor, or may be performed and completed by using a combination of hardware and software modules in the decoding processor. The software module may be located in a mature storage medium in the field such as a random access memory, a read-only memory, a programmable read-only memory, or an electrically erasable programmable read-only memory (electrically erasable programmable read only memory, EEPROM). The storage medium is located in the memory 904, and the processor 901 reads information in the memory 904, and completes the steps in the foregoing methods in combination with hardware thereof.

The processor 901, the memory 904, and the communication interface 903 may communicate with each other by using the communication line 902.

In the foregoing embodiments, the instructions stored in the memory for being executed by the processor may be implemented in a form of a computer program product. The computer program product may be written into the memory in advance, or may be downloaded to and installed in the memory in a form of software.

Embodiments of this application further provide a computer program product, including one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (digital subscriber line, DSL)) or a wireless (for example, infrared, radio, and microwave, or the like) manner. The computer-readable storage medium may be any usable medium accessible by the computer, or a data storage device, such as a server or a data center, integrated with one or more usable media. For example, the usable medium may include a magnetic medium (for example, a floppy disk, a hard disk, or a magnetic tape), an optical medium (for example, a digital versatile disc (digital versatile disc, DVD)), a semiconductor medium (for example, a solid state disk (solid state disk, SSD)), or the like.

Embodiments of this application further provide a computer-readable storage medium. All or some of methods in the foregoing embodiments may be implemented by using software, hardware, firmware, or any combination thereof. If implemented in software, the functions may be stored in a computer-readable medium or transmitted over a computer-readable medium as one or more instructions or code. The computer-readable medium may include a computer storage medium and a communication medium, and may further include any medium that can transmit a computer program from one place to another. The storage medium may be any target medium accessible by a computer.

In a possible implementation, the computer-readable medium may include a RAM, a ROM, a compact disc read-only memory (compact disc read-only memory, CD-ROM) or another optical disk memory, a magnetic disk memory or another magnetic storage device, or any other medium that is to carry or store required program code in a form of an instruction or a data structure, and may be accessed by a computer. In addition, any connection line is appropriately referred to as a computer-readable medium. For example, if software is transmitted from a website, a server, or another remote source by using a coaxial cable, an optical fiber cable, a twisted pair, a digital subscriber line (Digital Subscriber Line, DSL), or wireless technologies (such as infrared, radio, and microwave), the coaxial cable, optical fiber cable, twisted pair, DSL, or wireless technologies such as infrared, radio, and microwave are included in the definition of the medium. A magnetic disk and an optical disc used herein include an optical disc, a laser disc, an optical disc, a digital versatile disc (Digital Versatile Disc, DVD), a floppy disk, and a blue ray disc, where the magnetic disk generally reproduces data in a magnetic manner, and the optical disc reproduces data optically by using laser. The foregoing combination should also be included in the scope of the computer-readable medium.

Embodiments of this application are described with reference to the flowcharts and/or block diagrams of the method, the device (system), and the computer program product according to embodiments of this application. It should be understood that computer program instructions can implement each procedure and/or block in the flowcharts and/or block diagrams and a combination of procedures and/or blocks in the flowcharts and/or block diagrams. These computer program instructions may be provided for a general-purpose computer, a dedicated computer, an embedded processor, or a processing unit of any other programmable data processing device to generate a machine, so that the instructions executed by a computer or a processing unit of any other programmable data processing device generate an apparatus used for implementing a specific function in one or more processes in the flowcharts and/or in one or more blocks in the block diagrams.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A method, comprising:

obtaining to-be-rendered data that comprises a to-be-rendered model;

performing ray tracing rendering on the to-be-rendered model based on first ray emission density when the to-be-rendered model meets a first condition, wherein the first condition comprises a visible range proportion of the to-be-rendered model in a to-be-rendered picture being a first visible range proportion, and a distance between the to-be-rendered model and a photographing apparatus being a first distance;

performing ray tracing rendering on the to-be-rendered model based on second ray emission density when the to-be-rendered model meets a second condition, wherein the second condition comprises the visible range proportion of the to-be-rendered model in the to-be-rendered picture being a second visible range proportion, and the distance between the to-be-rendered model and the photographing apparatus being a second distance; and performing, based on a preset first weight coefficient and second weight coefficient, weighted summation on the visible range proportion of the to-be-rendered model in the to-be-rendered picture and the distance between the to-be-rendered model and the photographing apparatus to obtain a ray emission density coefficient of the to-be-rendered model, wherein the ray emission density of the to-be-rendered model is based on the ray emission density coefficient of the to-be-rendered model and a preset first relationship that indicates a correspondence between the ray emission density coefficient and the ray emission density, wherein the first visible range proportion is different from the second visible range proportion, and/or the first distance is different from the second distance, wherein the to-be-rendered picture is drawn through the photographing apparatus based on the to-be-rendered data in a rendering process, wherein the photographing apparatus is a virtual camera in an electronic device, wherein the ray emission density of the to-be-rendered model is based on a condition met by the to-be-rendered model according to the visible range proportion of the to-be-rendered model in the to-be-rendered picture and the distance between the to-be-rendered model and the photographing apparatus, wherein the ray emission density is the first ray emission density when the condition met by the to-be-rendered model is the first condition, and wherein the ray emission density is the second ray emission density when the condition met by the to-be-rendered model is the second condition.

2. The method of claim 1, wherein when the first visible range proportion is the same as the second visible range proportion, the first ray emission density is less than the second ray emission density if the first distance is greater than the second distance.

3. The method of claim 1, wherein when the first distance is the same as the second distance, the first ray emission density is greater than the second ray emission density if the first visible range proportion is greater than the second visible range proportion.

4. The method of claim 1, wherein performing ray tracing rendering on the to-be-rendered model based on the ray emission density comprises:

performing ray tracing rendering on the to-be-rendered model based on the ray emission density to obtain a ray tracing rendering result image of the to-be-rendered model, wherein the ray tracing rendering result image carries a hole pixel; and performing color filling on the hole pixel in the ray tracing rendering result image according to a template value of each pixel of the to-be-rendered model during drawcall and a scene semantic image of the to-be-rendered model, wherein the scene semantic image is for identifying a model to which a pixel belongs.

5. The method of claim 4, wherein a target pixel on which ray tracing rendering is to be performed in the to-be-rendered model is based on the ray emission density and a preset shaded pixel arrangement, wherein the shaded pixel arrangement indicates position arrangement information of a pixel rendered by using ray tracing, and wherein performing ray tracing rendering on the to-be-rendered model based on the ray emission density to obtain the ray tracing rendering result image of the to-be-rendered model comprises:

performing ray tracing rendering on the target pixel to obtain color data of the target pixel; and outputting the color data to a position at which the target pixel is located to obtain the ray tracing rendering result image of the to-be-rendered model.

6. The method of claim 4, wherein performing color filling on the hole pixel in the ray tracing rendering result image according to the template value of each pixel of the to-be-rendered model during drawcall and the scene semantic image of the to-be-rendered model comprises performing, when a current pixel that is sampled is a hole pixel, color filling on the hole pixel by using color data of a reference pixel, wherein the reference pixel is based on the template value of each pixel of the to-be-rendered model during drawcall and the scene semantic image, wherein the reference pixel has a same template value as the hole pixel on the ray tracing rendering result image, and wherein the reference pixel is a pixel that is on the ray tracing rendering result image and already has color data.

7. The method of claim 6, further comprising:

obtaining, according to the scene semantic image of the to-be-rendered model, texture coordinates of the hole pixel and texture coordinates of a first pixel that is on the ray tracing rendering result image and already has color data; and querying a template buffering position based on the texture coordinates of the hole pixel and the texture coordinates of the first pixel, wherein the template buffering position is for storing the template value of each pixel of the to-be-rendered model during drawcall, wherein when a template value of the hole pixel is consistent with a template value of the first pixel, the first pixel is the reference pixel of the hole pixel, and wherein when the template value of the hole pixel is inconsistent with the template value of the first pixel, the method further comprises traversing other pixels that are on the ray tracing rendering result image and already have color data until the reference pixel having the same template value as the hole pixel is identified.

8. The method of claim 1, wherein performing ray tracing rendering on the to-be-rendered model comprises performing ray tracing rendering on the to-be-rendered model by using a bound vulkan ray tracing acceleration structure.

9. An electronic device, comprising:

one or more processors; and a memory coupled to the one or more processors and configured to store instructions that, when executed by the one or more processors, cause the electronic device to be configured to:

obtain to-be-rendered data that comprises a to-be-rendered model;

perform ray tracing rendering on the to-be-rendered model based on first ray emission density when the to-be-rendered model meets a first condition, wherein the first condition comprises a visible range proportion of the to-be-rendered model in a to-be-rendered picture being a first visible range proportion, and a distance between the to-be-rendered model and a photographing apparatus being a first distance;

perform ray tracing rendering on the to-be-rendered model based on second ray emission density when the to-be-rendered model meets a second condition, wherein the second condition comprises the visible range proportion of the to-be-rendered model in the to-be-rendered picture being a second visible range proportion, and the distance between the to-be-rendered model and the photographing apparatus being a second distance; and perform, based on a preset first weight coefficient and second weight coefficient, weighted summation on the visible range proportion of the to-be-rendered model in the to-be-rendered picture and the distance between the to-be-rendered model and the photographing apparatus, to obtain a ray emission density coefficient of the to-be-rendered model, wherein the ray emission density of the to-be-rendered model is based on the ray emission density coefficient of the to-be-rendered model and a preset first relationship that indicates a correspondence between the ray emission density coefficient and the ray emission density, wherein the first visible range proportion is different from the second visible range proportion, and/or the first distance is different from the second distance, wherein the to-be-rendered picture is drawn through the photographing apparatus based on the to-be-rendered data in a rendering process, wherein the photographing apparatus is a virtual camera in an electronic device, wherein the ray emission density of the to-be-rendered model is based on a condition met by the to-be-rendered model according to the visible range proportion of the to-be-rendered model in the to-be-rendered picture and the distance between the to-be-rendered model and the photographing apparatus, wherein the ray emission density is the first ray emission density when the condition met by the to-be-rendered model is the first condition, and wherein the ray emission density is the second ray emission density when the condition met by the to-be-rendered model is the second condition.

10. The electronic device of claim 9, wherein when the first visible range proportion is the same as the second visible range proportion, the first ray emission density is less than the second ray emission density if the first distance is greater than the second distance.

11. The electronic device of claim 9, wherein when the first distance is the same as the second distance, the first ray emission density is greater than the second ray emission density if the first visible range proportion is greater than the second visible range proportion.

12. The electronic device of claim 9, wherein performing ray tracing rendering on the to-be-rendered model based on the ray emission density comprises:

performing ray tracing rendering on the to-be-rendered model based on the ray emission density to obtain a ray tracing rendering result image of the to-be-rendered model, wherein the ray tracing rendering result image carries a hole pixel; and performing color filling on the hole pixel in the ray tracing rendering result image according to a template value of each pixel of the to-be-rendered model during drawcall and a scene semantic image of the to-be-rendered model, wherein the scene semantic image is for identifying a model to which a pixel belongs.

13. The electronic device of claim 12, wherein a target pixel on which ray tracing rendering is to be performed in the to-be-rendered model is based on the ray emission density and a preset shaded pixel arrangement, wherein the shaded pixel arrangement indicates position arrangement information of a pixel rendered by using ray tracing, and wherein performing ray tracing rendering on the to-be-rendered model based on the ray emission density to obtain a ray tracing rendering result image of the to-be-rendered model comprises:

performing ray tracing rendering on the target pixel to obtain color data of the target pixel; and outputting the color data to a position at which the target pixel is located to obtain the ray tracing rendering result image of the to-be-rendered model.

14. The electronic device of claim 12, wherein performing color filling on the hole pixel in the ray tracing rendering result image according to the template value of each pixel of the to-be-rendered model during drawcall and the scene semantic image of the to-be-rendered model comprises performing, when a current pixel that is sampled is a hole pixel, color filling on the hole pixel by using color data of a reference pixel, wherein the reference pixel is based on the template value of each pixel of the to-be-rendered model during drawcall and the scene semantic image, wherein the reference pixel has a same template value as the hole pixel on the ray tracing rendering result image, and wherein the reference pixel is a pixel that is on the ray tracing rendering result image and already has color data.

15. The electronic device of claim 9, wherein performing ray tracing rendering on the to-be-rendered model comprises performing ray tracing rendering on the to-be-rendered model by using a bound vulkan ray tracing acceleration structure.

16. A non-transitory computer-readable medium storing instructions that, when executed by one or more processors of an electronic device, cause the electronic device to be configured to:

obtain to-be-rendered data that comprises a to-be-rendered model;

perform ray tracing rendering on the to-be-rendered model based on first ray emission density when the to-be-rendered model meets a first condition, wherein the first condition comprises a visible range proportion of the to-be-rendered model in a to-be-rendered picture being a first visible range proportion, and a distance between the to-be-rendered model and a photographing apparatus being a first distance;

perform ray tracing rendering on the to-be-rendered model based on second ray emission density when the to-be-rendered model meets a second condition, wherein the second condition comprises the visible range proportion of the to-be-rendered model in the to-be-rendered picture being a second visible range proportion, and the distance between the to-be-rendered model and the photographing apparatus being a second distance; and perform, based on a preset first weight coefficient and second weight coefficient, weighted summation on the visible range proportion of the to-be-rendered model in the to-be-rendered picture and the distance between the to-be-rendered model and the photographing apparatus, to obtain a ray emission density coefficient of the to-be-rendered model, wherein the ray emission density of the to-be-rendered model is based on the ray emission density coefficient of the to-be-rendered model and a preset first relationship that indicates a correspondence between the ray emission density coefficient and the ray emission density, wherein the first visible range proportion is different from the second visible range proportion, and/or the first distance is different from the second distance, wherein the to-be-rendered picture is drawn through the photographing apparatus based on the to-be-rendered data in a rendering process, wherein the photographing apparatus is a virtual camera in an electronic device, wherein the ray emission density of the to-be-rendered model is based on a condition met by the to-be-rendered model according to the visible range proportion of the to-be-rendered model in the to-be-rendered picture and the distance between the to-be-rendered model and the photographing apparatus, wherein the ray emission density is the first ray emission density when the condition met by the to-be-rendered model is the first condition, and wherein the ray emission density is the second ray emission density when the condition met by the to-be-rendered model is the second condition.

17. The non-transitory computer-readable medium of claim 16, wherein when the first visible range proportion is the same as the second visible range proportion, the first ray emission density is less than the second ray emission density if the first distance is greater than the second distance.

18. The non-transitory computer-readable medium of claim 16, wherein when the first distance is the same as the second distance, the first ray emission density is greater than the second ray emission density if the first visible range proportion is greater than the second visible range proportion.

19. The non-transitory computer-readable medium of claim 16, wherein performing ray tracing rendering on the to-be-rendered model based on the ray emission density comprises:

performing ray tracing rendering on the to-be-rendered model based on the ray emission density to obtain a ray tracing rendering result image of the to-be-rendered model, wherein the ray tracing rendering result image carries a hole pixel; and performing color filling on the hole pixel in the ray tracing rendering result image according to a template value of each pixel of the to-be-rendered model during drawcall and a scene semantic image of the to-be-rendered model, wherein the scene semantic image is for identifying a model to which a pixel belongs.

20. The non-transitory computer-readable medium of claim 19, wherein a target pixel on which ray tracing rendering is to be performed in the to-be-rendered model is based on the ray emission density and a preset shaded pixel arrangement, wherein the shaded pixel arrangement indicates position arrangement information of a pixel rendered by using ray tracing, and wherein performing ray tracing rendering on the to-be-rendered model based on the ray emission density to obtain the ray tracing rendering result image of the to-be-rendered model comprises:

performing ray tracing rendering on the target pixel to obtain color data of the target pixel; and outputting the color data to a position at which the target pixel is located to obtain the ray tracing rendering result image of the to-be-rendered model.

* * * * *